United States Patent
Zhamu et al.

(10) Patent No.: US 10,822,725 B2
(45) Date of Patent: Nov. 3, 2020

(54) CONTINUOUS GRAPHITIC FIBERS FROM LIVING GRAPHENE MOLECULES

(71) Applicant: Nanotek Instruments, Inc., Dayton, OH (US)

(72) Inventors: Aruna Zhamu, Centerville, OH (US); Bor Z Jang, Centerville, OH (US)

(73) Assignee: GLOBAL GRAPHENE GROUP, INC., Dayton, OH (US)

( * ) Notice: Subject to any disclaimer, the term of this patent is extended or adjusted under 35 U.S.C. 154(b) by 957 days.

(21) Appl. No.: 13/986,223

(22) Filed: Apr. 15, 2013

(65) Prior Publication Data
US 2014/0308517 A1   Oct. 16, 2014

(51) Int. Cl.
| | |
|---|---|
| *D01F 9/12* | (2006.01) |
| *D01D 5/14* | (2006.01) |
| *D01D 10/02* | (2006.01) |
| *C01B 32/194* | (2017.01) |
| *D01D 1/02* | (2006.01) |
| *D01D 5/04* | (2006.01) |

(52) U.S. Cl.
CPC .............. *D01F 9/12* (2013.01); *C01B 32/194* (2017.08); *D01D 1/02* (2013.01); *D01D 5/04* (2013.01); *D01D 10/02* (2013.01); *Y10T 428/2918* (2015.01)

(58) Field of Classification Search
CPC ... D01F 9/12; D01D 1/02; D01D 5/04; D01D 10/02; Y10T 428/2918; C01B 32/194
See application file for complete search history.

(56) References Cited

U.S. PATENT DOCUMENTS

| | | |
|---|---|---|
| 7,071,258 B1 | 7/2006 | Jang et al. |
| 8,710,956 B2 | 4/2014 | Longo |
| 2005/0271574 A1 | 12/2005 | Jang et al. |
| 2008/0048152 A1 | 2/2008 | Jang et al. |

(Continued)

FOREIGN PATENT DOCUMENTS

WO    2017213959 A1    12/2017

OTHER PUBLICATIONS

"Measurement of small misorientations using electron back scatter diffraction" Angus J. Wilkinson Inst. Phys. Conf. Ser. No. 161 Section 3 (paper presented at Electron Microscopy and Analysis Group Conf. EMAG(( Sheffield 1999).*

(Continued)

*Primary Examiner* — Kevin R Kruer
(74) *Attorney, Agent, or Firm* — Thompson Hine LLP

(57) ABSTRACT

A unitary graphene-based continuous graphitic fiber comprising at least 90% by weight of graphene planes that are chemically bonded with one another having an inter-planar spacing from 0.3354 to 0.4 nm and an oxygen content of 0.01 to 5% by weight, wherein the graphene planes are parallel to one another and parallel to a fiber axis direction and the graphitic fiber contains no core-shell structure, have no helically arranged graphene domains, and have a porosity level less than 5% by volume. This fiber can be produced by a continuous filament of graphene oxide gel having living graphene oxide molecules or functionalized graphene chains dissolved in a fluid medium. The filament is deposited onto a supporting substrate under a molecule-aligning stress condition along the filament axis direction and then subjected to drying and heating treatments.

27 Claims, 20 Drawing Sheets

(56) References Cited

U.S. PATENT DOCUMENTS

| | | | |
|---|---|---|---|
| 2008/0248275 A1 | 10/2008 | Jang et al. | |
| 2011/0046289 A1* | 2/2011 | Zhamu | C08K 3/04 524/495 |
| 2013/0236715 A1* | 9/2013 | Zhamu | B82Y 30/00 428/220 |
| 2014/0147648 A1* | 5/2014 | Zhamu | C30B 5/00 428/220 |
| 2014/0242275 A1* | 8/2014 | Zhamu | C01B 31/0423 427/228 |
| 2015/0038041 A1* | 2/2015 | Zhamu | D03D 15/00 442/195 |
| 2016/0026846 A1 | 1/2016 | Lin et al. | |
| 2017/0316891 A1 | 11/2017 | Zhamu et al. | |

OTHER PUBLICATIONS

Measurement Techniques for Thermal Conductivity and Interfacial Thermal Conductance of Bulk and Thin Film Materials Dongliang Zhao, Xin Qian, Xiaokun Gu, Saad Ayub Jajja, Ronggui Yang; Department of Mechanical Engineering, University of Colorado, Boulder, CO 80309-0427-1-8-2018.*

"Improvement of the laser flash method to reduce uncertainty in thermal diffusivity mesurements" Tetsuya Baba and Akira Ono 2001 Meas. Sci. Technol. 12 2046 (Nov. 2001).*

"Measuring the Electrical Conductivity of Single Fibres" Serge Rebouillat and Michael E.G. Lyons; Int. J. Electrochem. Sci. 6 (2011) 5731-5740 (Nov. 2011).*

Cong et al., "Wet-spinning assembly of continuous, neat, and macroscopic graphene fibers" Scientific Report (2012) vol. 2, p. 613.

Dong et al., "Facile fabrication of light, flexible and multifunctional graphene fibers" Adv. Mater. (2012) vol. 24, pp. 1856-1861.

Xu et al., "Graphene chiral liquid crystals and macroscopic assembled fibers" Nature Communications (2011) vol. 2, p. 571.

Kim, J. H. et al.; "Effects of fiber gripping methods on single fiber tensile test using Kolsky bar"; SEM Annual Conference, Indianapolis, IN, 6 pages (Jun. 7-10, 2010).

"Thermal Conductivity Measurement", Wikipedia, (https://en.wikipedia.org/wiki/Thermal_conductivity_measurement), 9 pages, Mar. 2, 2020.

U.S. Appl. No. 10/858,814, filed Jun. 3, 2004, B Z Jang, et al.
U.S. Appl. No. 11/509,424, filed Aug. 25, 2006, B Z Jang, et al.
U.S. Appl. No. 11/784,606, filed Apr. 9, 2007, B Z Jang, et al.
Z. Xu & C. Gao, "Graphene chiral liquid crystals and macroscopic assembled fibers," Nature Communications, 2, 571 (2011).
H. P. Cong, et al. "Wet-spinning assembly of continuous, neat, and macroscopic graphene fibers," Scientific Report, 2 (2012) 613; DOI: 10.1038/srep00613.
Z. Dong, et al. "Facile fabrication of light, flexible and multifunctional graphene fibers," Adv. Mater. 24, 1856-1861 (2012).

* cited by examiner (Scale bar ⎯⎯ = 5 μm per interval)   Arrow = fiber axis direction

CONTINUOUS GRAPHITIC FIBERS FROM LIVING GRAPHENE MOLECULES

FIELD OF THE INVENTION

The present invention relates generally to the field of graphite fibers and, more particularly, to a new class of continuous graphitic fibers produced from living graphene molecules or chains. This class of nearly perfect graphitic fiber exhibits a combination of exceptionally high tensile strength, elastic modulus, thermal conductivity, and electrical conductivity unmatched by any type of continuous fibers.

BACKGROUND OF THE INVENTION

Continuous carbon fibers and graphite fibers are produced from pitch, polyacrylonitrile (PAN), and rayon. Most carbon fibers (about 90%) are made from PAN fibers. A small amount (about 10%) is manufactured from petroleum pitch or rayon. Although the production of carbon fibers from different precursors requires different processing conditions, the essential features are very similar. Generally, carbon fibers are manufactured by a controlled pyrolysis of stabilized precursor fibers. Precursor fibers (e.g. PAN) are first stabilized at about 200-400° C. in air by an oxidization process. The resulting infusible, stabilized fibers are then subjected to a high temperature treatment at approximately 1,000-1,500° C. (up to 2,000° C. in some cases) in an inert atmosphere to remove hydrogen, oxygen, nitrogen, and other non-carbon elements. This step is often called carbonization and it can take 2-24 hours to complete, depending upon the carbonization temperature and the starting material used. Carbonized fibers can be further graphitized at an even higher temperature, up to around 3,000° C. to achieve higher carbon content and higher degree of graphitization, mainly for the purpose of achieving higher Young's modulus or higher strength in the fiber direction. This takes another 1-4 hours under strictly controlled atmosphere and ultra-high temperature conditions. The properties of the resulting carbon/graphite fibers are affected by many factors, such as crystallinity, crystallite sizes, molecular orientation, carbon content, and the type and amount of defects.

Specifically, the carbon fibers can be heat-treated to become high modulus graphite fibers (from pitch) or high strength carbon fibers (from PAN-based). Carbon fibers heated in the range of 1500-2000° C. (carbonization) exhibits the highest tensile strength (5,650 MPa), while carbon fiber heated from 2500 to 3000° C. (graphitizing) exhibits a higher modulus of elasticity (531 GPa). The tensile strength of carbon/graphite fibers is typically in the range of 1-6 GPa, and the Young's modulus is typically in the range of 100-588 GPa.

Broadly speaking, in terms of final mechanical properties, carbon/graphite fibers can be roughly classified into ultra-high modulus (>500 GPa), high modulus (>300 GPa), intermediate modulus (>200 GPa), low modulus (100 GPa), and high strength (>4 GPa) carbon fibers. Carbon fibers can also be classified, based on final heat treatment temperatures, into type I (2,000° C. heat treatment), type II (1,500° C. heat treatment), and type III (1,000° C. heat treatment). Type II PAN-based carbon fibers are usually high strength carbon fibers, while most of the high modulus carbon fibers belong to type I from pitch.

Regardless the type of carbon fibers or graphite fibers desired, the production of continuous carbon fibers and graphite fibers from pitch, PAN, and rayon is a tedious, energy-intensive, very challenging (requiring extreme temperature and atmosphere control), and expensive process. A strong need exists for a facile, less energy-intensive, simpler and more scalable, and more cost-effective process for producing advanced graphite fibers.

Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material, including graphite fiber). The carbon nano-tube (CNT) refers to a tubular structure grown with a single wall or multi-wall. Carbon nano-tubes (CNTs) and carbon nano-fibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material. Although multiple CNTs or CNFs can be spun into fiber yarns, these yarns are not considered as "continuous fibers". They are twisted aggregates of individual CNTs or CNFs (each being but a few microns long) that are not self-bonded together; instead, they are mechanically fastened together as a yarn.

Bulk natural graphite is a 3-D graphitic material with each particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another.

A graphite single crystal (crystallite) per se is anisotropic with a property measured along a direction in the basal plane (crystallographic a- or b-axis direction) being dramatically different than if measured along the crystallographic c-axis direction (thickness direction). For instance, the thermal conductivity of a graphite single crystal can be up to approximately 1,920 W/mK (theoretical) or 1,800 W/mK (experimental) in the basal plane (crystallographic a- and b-axis directions), but that along the crystallographic c-axis direction is less than 10 W/mK (typically less than 5 W/mK). Further, the multiple grains or crystallites in a graphite particle are typically all oriented along different directions. Consequently, a natural graphite particle composed of multiple grains of different orientations exhibits an average property between these two extremes; i.e. between 5 W/mK and 1,800 W/mK.

It would be highly desirable in many applications to produce a bulk graphite particle or graphitic fiber (containing single or multiple grains) having sufficiently large dimensions and having all graphene planes being essentially parallel to one another along one desired direction (e.g. along the fiber axis). For instance, it is highly desirable to have one large-size graphite entity (e.g. a fully integrated or unitary filament of multiple graphene planes) having all the constituent graphene planes being substantially parallel to one another along the fiber axis direction, and having a sufficiently large length. It would be further desirable if such a "giant graphite particle or fiber" has only one grain or few grains (thus, no or little grain boundaries) and has few defects therein to impede the flow of electrons and phonons. Thus far, it has not been possible to produce this type of large-size unitary graphene entity (fiber) from existing natural or synthetic graphite particles.

The constituent graphene planes of a graphite crystallite can be exfoliated and extracted or isolated from a graphite crystallite to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an inter-graphene plane spacing of 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets or NGPs are a new class of carbon nano material (a 2-D nano carbon) that is distinct from the O-D fullerene, the 1-D CNT, and the 3-D graphite.

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

NGPs are typically obtained by intercalating natural graphite particles with a strong acid and/or oxidizing agent to obtain a graphite intercalation compound (GIC) or graphite oxide (GO), as illustrated in FIG. 1(a) (process flow chart) and FIG. 1(b) (schematic drawing). The presence of chemical species or functional groups in the interstitial spaces between graphene planes serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (20 in FIGS. 1(a) and 100 in FIG. 1(b)) in a mixture of sulfuric acid, nitric acid (an oxidizing agent), and another oxidizing agent (e.g. potassium permanganate or sodium perchlorate). The resulting GIC (22 or 102) is actually some type of graphite oxide (GO) particles. This GIC is then repeatedly washed and rinsed in water to remove excess acids, resulting in a graphite oxide suspension or dispersion, which contains discrete and visually discernible graphite oxide particles dispersed in water. This rinsing step may be followed by several different processing routes:

For instance, Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid expansion by a factor of 30-300 to form "graphite worms" (24 or 104), which are each a collection of exfoliated, but largely unseparated graphite flakes that remain interconnected. A SEM image of graphite worms is presented in FIG. 2(a).

In Route 1A, these graphite worms (exfoliated graphite or "networks of interconnected/non-separated graphite flakes") can be re-compressed to obtain flexible graphite sheets or foils (26 or 106) that typically have a thickness in the range of 0.1 mm (100 µm)-0.5 mm (500 µm). Flexible graphite (FG) foils can be used as a heat spreader material, but exhibiting a maximum in-plane thermal conductivity of typically less than 500 W/mK (more typically <300 W/mK) and in-plane electrical conductivity no greater than 1,500 S/cm. These low conductivity values are a direct result of the many defects, wrinkled or folded graphite flakes, interruptions or gaps between graphite flakes, and non-parallel flakes (e.g. SEM image in FIG. 2(b)). Many flakes are inclined with respect to one another at a very large angle (e.g. mis-orientation of 20-40 degrees).

Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nano material by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 33 or 112), as disclosed in our U.S. application Ser. No. 10/858,814. Single-layer graphene can be as thin as 0.34 nm, while multi-layer graphene can have a thickness up to 100 nm, but more typically less than 20 nm.

Exfoliated graphite worms, expanded graphite flakes, and the recompressed mass of graphite worms (commonly referred to as flexible graphite sheet or flexible graphite foil) are all 3-D graphitic materials that are fundamentally different and patently distinct from either the 1-D nano carbon material (CNT or CNF) or the 2-D nano carbon material (graphene sheets or platelets, NGPs).

Route 2 entails ultrasonicating the graphite oxide suspension for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight and, most typically and desirably, less than 2% by weight.

For the purpose of defining the claims of the instant application, NGPs include discrete sheets/platelets of single-layer and multi-layer graphene, graphene oxide, or reduced graphene oxide with an oxygen content of 0-10% by weight, more typically 0-5% by weight, and preferably 0-2% by weight. Pristine graphene has essentially 0% oxygen. Graphene oxide (including RGO) can have approximately 0.001%-50% by weight of oxygen.

The GO molecules in graphene oxide gel, to be described in detail later, typically contain 20-50% by weight oxygen (more typically 30-47%) immediately after removal of the liquid from the GO gel, but prior to a subsequent heat treatment. The GO gel refers to a homogeneous solution of highly hydrophilic aromatic molecules (graphene oxide molecules bearing oxygen-containing groups, such as —OH, —COOH, and >O, on molecular planes or at the edges) that are dissolved (not just dispersed) in a liquid (e.g. acidic water). The GO gel per se does not contain visibly discernible or discrete graphene or GO particles in the form of solid sheets or platelets dispersed in the liquid medium. These GO molecules and the dissolving liquid medium have comparable indices of refraction, making the resulting gel optically transparent or translucent (if the proportion of GO molecules are not excessively high; e.g. <2% GO), or showing lightly brown color. In contrast, the simple mixture of original graphite particles or discrete graphene sheets/platelets with acids and/or water appears optically dark and totally opaque (even with only <0.1% solid particles suspended in the liquid medium). These particles or NGP platelets are simply dispersed (not dissolved) in the fluid medium.

These GO molecules in a GO gel are highly reactive and may be considered as "living giant molecules" or "living chains". By contrast, the prior art solid sheets/platelets of graphene, GO, and RGO are essentially "dead" species. The GO gel can be formed into a shape with a proper shearing or compression stress (e.g. via casting or extrusion through a tapered-diameter nozzle), dried (with liquid components partially or totally removed), and heat-treated under certain conditions to obtain a unitary graphene material (e.g. a continuous filament of the instant invention), which is typically a single crystal, a poly-crystal with incomplete or poorly delineated grain boundaries, or a poly-crystal with very large grain sizes (very few grains). The heat treatment serves to chemically link these active or living GO molecules to form a 2-D or 3-D network of chemically bonded graphene molecules of essentially infinite molecular weights, and to drastically reduce the oxygen content of GO down to below 10% by weight, more typically <5%, further more typically <2%, and most typically <<1%. Only a trace amount of oxygen (practically 0%) can survive if the heat treatment temperature is sufficiently high (>2,000° C.) and heat treatment time sufficiently long. This new and unique material called "unitary graphene material" in a continuous filament form will be further described in detail later. When in a filamentary form as disclosed herein, this unitary graphene material is a nearly perfect graphitic fiber.

Solid or "dead" NGPs (including discrete sheets/platelets of pristine graphene, GO, and GRO), when packed into a film, membrane, or paper sheet (34 or 114) of non-woven aggregates, typically do not exhibit a high thermal conductivity unless these sheets/platelets are closely packed and the film/membrane/paper is ultra-thin (e.g. <1 μm, which is mechanically weak). This is reported in our earlier U.S. patent application Ser. No. 11/784,606 (Apr. 9, 2007). In general, a paper-like structure or mat made from platelets/sheets of graphene, GO, or RGO (e.g. those paper sheets prepared by vacuum-assisted filtration process) exhibit many defects, wrinkled or folded graphene sheets, interruptions or gaps between platelets, and non-parallel platelets (e.g. SEM image in FIG. 3(*b*)), leading to relatively poor thermal conductivity, low electric conductivity, and low structural strength.

In a recent report [Z. Xu & C. Gao, "Graphene chiral liquid crystals and macroscopic assembled fibers," *Nature Communications*, 2, 571 (2011)], graphene oxide sheets can form chiral liquid crystals in a twist-grain-boundary phase-like model with simultaneous lamellar ordering and long-range helical frustrations. Aqueous graphene oxide liquid crystals can then be continuously spun into meters of macroscopic graphene oxide fibers, which are chemically reduced to obtain RGO fibers. During the spinning process for GO fibers, the GO dispersions were loaded into glass syringes and injected into the NaOH/methanol solution under the conditions of 1.5 MPa $N_2$. The NaOH/methanol solution is a coagulation solution (a non-solvent for GO) and the GO sheets are precipitated out as discrete/isolated sheets that are mechanical fatened in the fiber form as soon as the GO dispersions came in contact with the non-solvent. The fibers produced in the coagulation bath were then rolled onto a drum, washed by methanol to remove the salt, and dried for 24 hours at room temperature. The as-prepared GO fibers were then chemically reduced in the aqueous solution of hydro-iodic acid (40%) at 80° C. for 8 hours, followed by washing with methanol and vacuum drying for 12 hours.

Clearly, this is a very tedious and time-consuming process. Further, the GO sheets must be dispersed in water to a critical extent that they form chiral liquid crystals with a twist-grain-boundary phase structure in the GO suspension. This chiral or twist-grain boundary structure is a fatal defect as far as the mechanical strength of macroscopic graphene fibers is concerned, as evidenced by the relatively low tensile strength (102 MPa) reported by Xu, et al. This is three orders of magnitude lower than the intrinsic strength (130 GPa) of individual graphene sheets. Another severe problem of this process is the notion that the spinning-coagulation procedure inherently results in highly porous and non-oriented graphene sheets in the graphene fiber (e.g. FIGS. 2(*c*) and 2(*d*)). This porous and non-parallel graphene structure is another reason responsible for such a low tensile strength and low Young's modulus (5.4 GPa), which is almost three orders of magnitude lower than the theoretical Young's modulus of graphene (1,000 GPa).

A similar spinning-coagulation process was reported by Cong, et al [H. P. Cong, et al. "Wet-spinning assembly of continuous, neat, and macroscopic graphene fibers," Scientific Report, 2 (2012) 613; DOI: 10.1038/srep00613]. Again, the reported tensile strength and Young's modulus of the graphene fibers are very poor: 145 MPa and 4.2 GPa, respectively. Slightly better tensile strength (180 MPa) was observed with graphene oxide fibers prepared by a confined-dimension hydrothermal method was reported [Z. Dong, et al. "Facile fabrication of light, flexible and multifunctional graphene fibers," Adv. Mater. 24, 1856-1861 (2012)]. Even after a thermal reduction treatment, the maximum achievable tensile strength was only 420 MPa. Again, the graphene sheets in these graphene fibers, just like in the graphene fibers prepared by spinning-coagulation, remain discrete and poorly oriented. The fibers are also highly porous and of limited length. Furthermore, this process is not a scalable process and cannot be used to mass-produce continuous graphene fibers.

Thus, it is an object of the present invention to provide a process for producing high-strength and high-modulus continuous graphitic fibers by using particles of natural graphite or artificial graphite as the starting material.

A specific object of the present invention is to provide a graphene oxide gel-derived continuous graphitic fiber that is a unitary graphene material or monolithic graphene entity, not just an aggregate of discrete graphene or graphene oxide sheets.

It is another object of the present invention to provide a coagulation-free process for producing GO gel-derived unitary graphene filament that exhibit a combination of exceptional thermal conductivity, electrical conductivity, mechanical strength, and elastic modulus unmatched by any continuous graphene fibers or carbon fibers.

It is a specific object of the present invention to provide a highly conductive, continuous graphitic fiber that meets the following technical requirements (a) a thermal conductivity greater than 600 W/mK (preferably greater than 1,000 W/mK, and further preferably greater than 1,700 W/mK); (b) an electrical conductivity greater than 2,000 S/cm (preferably >3,000 S/cm, more preferably >5,000 S/cm, even more desirably >10,000 S/cm, and most preferably >15,000 S/cm); (c) a tensile strength greater than 1.2 GPa (preferably >3.2 GPa, more preferably >5.0 GPa, and most preferably >8.0 GPa); and/or (d) a Young's modulus strength greater than 60 GPa (preferably >200 GPa, more preferably >300 GPa, and most preferably >600 GPa). No prior art continuous graphitic fiber meets this set of technical requirements.

The present invention also provides a cost-effective method or process for producing a GO gel-derived unitary graphene-based, continuous graphitic fiber.

SUMMARY OF THE INVENTION

An embodiment of the present invention is a unitary graphene-based continuous graphitic fiber comprising at least 90% (more typically >95%) by weight of graphene planes that are chemically bonded with one another having an inter-planar spacing $d_{002}$ from 0.3354 nm to 0.4 nm as determined by X-ray diffraction and an oxygen content of 0.01 to 5% by weight, wherein the graphene planes are parallel to one another and parallel to a fiber axis direction and the graphitic fiber contains no core-shell structure, have no helically arranged graphene domains, and have a porosity level less than 5% by volume. Preferably, inter-plane spacing $d_{002}$ is from 0.3354 nm to 0.36 nm, the oxygen content is less than 5% by weight (preferably <2%), and porosity level less than 2% by volume. The unitary graphene-based continuous graphitic fiber may have a cross-section that is circular, elliptical, rectangular, flat-shaped, or hollow. The continuous graphitic fiber can have a diameter or thickness less than 100 μm, preferably less than 10 μm, and can be less than 1 μm or even less than 100 nm.

A preferred process for producing such a continuous graphitic fiber comprises: (a) preparing a graphene oxide gel having living graphene oxide molecules or functionalized graphene chains dissolved in a fluid medium; (b) depositing at least a continuous filament of graphene oxide gel onto a supporting substrate under a condition of stress-induced molecular alignment of living graphene oxide molecules along a filament axis direction; (c) removing the fluid medium to form a continuous graphene oxide fiber, having an inter-plane spacing $d_{002}$ of 0.4 nm to 1.2 nm and an oxygen content no less than 5% by weight; and (d) heat treating the continuous graphene oxide fiber to form the continuous graphitic fiber at a temperature higher than 600° C. (preferably >1,000° C.) to an extent that an inter-plane spacing $d_{002}$ is decreased to a value of 0.3354-0.36 nm and the oxygen content is decreased to less than 5% by weight.

The unitary graphene-based continuous graphitic fiber can have an oxygen content less than 1%, an inter-graphene spacing less than 0.345 nm, a thermal conductivity of at least 1,000 W/mK, and/or an electrical conductivity no less than 2,000 S/cm. More typically and preferably, the continuous graphitic fiber has an oxygen content less than 0.01%, an inter-graphene spacing less than 0.337 nm, a thermal conductivity of at least 1,200 W/mK, and/or an electrical conductivity no less than 4,500 S/cm. Further preferably and typically, the continuous graphitic fiber can have an oxygen content no greater than 0.001%, an inter-graphene spacing less than 0.336 nm, a mosaic spread value no greater than 0.7, a thermal conductivity of at least 1,500 W/mK, and/or an electrical conductivity no less than 7,000 S/cm. Still more preferably, the continuous graphitic fiber has an inter-graphene spacing less than 0.336 nm, a mosaic spread value no greater than 0.4, a thermal conductivity greater than 1,700 W/mK (even >1,800 W/mk in several fibers), and/or an electrical conductivity greater than 12,000 S/cm. Further preferably, the continuous graphitic fiber exhibits an inter-graphene spacing less than 0.337 nm and a mosaic spread value less than 1.0.

Another embodiment of the present invention is a unitary graphene-based continuous graphitic fiber that exhibits a degree of graphitization no less than 40% and/or a mosaic spread value less than 0.7 (further discussed later). Preferably, the continuous graphitic fiber exhibits a degree of graphitization no less than 80% and/or a mosaic spread value no greater than 0.4.

The unitary graphene-based continuous graphitic fiber contains chemically bonded graphene molecules or chemically merged graphene planes that are parallel to one another. Typically, the continuous graphitic fiber contains no complete grain boundary therein, is a graphite single crystal, or a poly-crystal graphite structure with graphene molecules being oriented along a fiber axis direction. The continuous graphitic fiber can be a poly-crystal graphitic structure having a grain size larger than 1 μm, preferably and typically larger than 10 μm, even more preferably and typically larger than 100 μm. The unitary graphene-based continuous graphitic fiber contains a combination of $sp^2$ and $sp^3$ electronic configurations if the final heat treatment temperature is significantly lower than 2,000° C. Above a HTT of 2,000° C., most of the bonding in the presently invented graphitic fiber appears to be $sp^2$ on graphene plane and van der Waals forces between graphene planes.

The unitary graphene-based continuous graphitic fiber typically has an electrical conductivity greater than 3,000 S/cm, a thermal conductivity greater than 600 W/mK, a physical density greater than 1.7 g/cm3, a Young's modulus greater than 60 GPa, and/or a tensile strength greater than 1.2 GPa. More typically, the unitary graphene-based continuous graphitic fiber has an electrical conductivity greater than 5,000 S/cm, a thermal conductivity greater than 1,000 W/mK, a physical density greater than 1.8 g/cm3, a Young's modulus greater than 200 GPa, and/or a tensile strength greater than 3.2 GPa. Even more typically, the continuous graphitic fiber has an electrical conductivity greater than 15,000 S/cm, a thermal conductivity greater than 1,500 W/mK, a physical density greater than 1.9 g/cm$^3$, a Young's modulus greater than 300 GPa, and/or a tensile strength greater than 5.0 GPa. With a sufficiently high heat treatment temperature, the unitary graphene-based continuous graphitic fiber can have an electrical conductivity greater than 18,000 S/cm, a thermal conductivity greater than 1,700 W/mK, a physical density greater than 1.9 g/cm$^3$, a Young's modulus greater than 600 GPa, and/or a tensile strength greater than 8.0 GPa.

The present invention also provides a fiber yarn or bundle that comprises at least a unitary graphene-based continuous graphitic fiber. The fiber yarn or bundle can comprise multiple graphene-based continuous graphitic fibers.

The present invention also provides a process for producing a continuous graphitic fiber from living graphene molecules, including graphene oxide and functionalized graphene molecules capable of chemically self-linking or bonding with one another (not just mechanical fastening or interlocking). The process comprises: (a) preparing a graphene oxide gel having living graphene oxide molecules or functionalized graphene chains dissolved in a fluid medium wherein the graphene oxide molecules contain an oxygen content higher than 10% by weight; (b) dispensing and depositing at least a continuous filament of graphene oxide gel onto a supporting substrate, wherein the dispensing and depositing procedure includes mechanical stress-induced molecular alignment of the living graphene oxide molecules or functionalized graphene chains along a filament axis direction; (c) partially or completely removing the fluid medium from said continuous filament to form a continuous graphene oxide fiber, wherein the graphene oxide fiber has an inter-plane spacing $d_{002}$ of 0.4 nm to 1.2 nm as determined by X-ray diffraction and an oxygen content no less than 10% by weight; and (d) heat treating the continuous graphene oxide fiber to form the continuous graphitic fiber at a heat treatment temperature higher than 100° C. (preferably >600° C. and more preferably >1,000° C.) to the extent that an inter-plane spacing $d_{002}$ is decreased to a value of from 0.3354 nm to 0.4 nm and the oxygen content is decreased to less than 5% by weight (preferably <1%).

In one preferred embodiment, step (c) includes forming a continuous graphene oxide fiber having an inter-plane spacing $d_{002}$ of 0.4 nm to 0.7 nm and an oxygen content no less than 10% by weight; and step (d) includes heat-treating the continuous graphene oxide fiber to an extent that an inter-plane spacing $d_{002}$ is decreased to a value of from 0.3354 nm to 0.36 nm and the oxygen content is decreased to less than 2% by weight.

In a preferred embodiment, the procedure of mechanical stress-induced molecular alignment includes shear-induced thinning of the graphene oxide gel. The graphene oxide gel preferably has a viscosity greater than 2,000 centipoise when measured at 20° C. prior to shear-induced thinning, and the viscosity is reduced to less than 2,000 centipoise during or after shear-induced thinning. In general, the graphene oxide gel has a viscosity from 500 centipoise to 500,000 centipoise when measured at 20° C. prior to the procedure of mechanical stress-induced molecular alignment. The viscosity is reduced to less than 2,000 centipoise during or after shear-induced thinning. Typically, the viscosity is decreased by at least 10 times when a shear rate is increased at 20° C. by a factor of 10. The procedure of mechanical stress-induced molecular alignment may be conducted via a procedure selected from coating, casting, injection, extrusion, pultrusion, or spinning of the graphene oxide gel onto a solid substrate along a fiber axis direction.

The procedure of mechanical stress-induced molecular alignment can involve a shear stress. Shear-induced thinning in step (b) means the GO gel is subjected to a shear stress during processing and a viscosity of the GO gel is reduced during and/or after the application of such a shear stress. As an example, the shear stress can be encountered in a situation where the GO gel is being extruded from an extrusion die slit that has a larger inner diameter (at a distance from the exit) gradually tapered to a smaller inner diameter at the exit point. As another example, an effective shear stress is created when a stream of GO gel is dispensed from a nozzle to a moving solid substrate, such as a plastic film, where the gap between the nozzle and the moving substrate can be reduced to induce a stronger shearing effect. In contrast, conventional spinning-coagulation processes allow the extruded strands of polymer chains to relax out when brought in contact with the coagulation liquid.

In another embodiment, step (d) includes heat treating the continuous graphene oxide fiber under a stress field that includes a local tension stress along a fiber axis direction. This tension force exerted on the GO fiber helps to maintain or even enhance the molecular orientation of the fiber during a heat treatment.

The continuous graphitic fiber can have a cross-section that is circular, elliptical, rectangular, flat-shaped, or hollow depending upon the geometry of the shaping die used. The diameter of the presently invented graphitic fiber can be varied from nanometer scaled to millimeter-scaled; there is no restriction on the fiber diameter. This is a very important feature that cannot be found in any other type of continuous carbon fiber or graphite fiber.

For instance, the GO gel-derived continuous graphitic fiber can have a diameter or thickness up to 100 μm (or greater), which cannot be obtained with conventional carbon or graphite fibers. The continuous graphitic fiber can have a diameter or thickness less than 10 μm or even less than 1 μm, which is not possible with other types of continuous carbon or graphite fibers having a high strength. Quite significantly, the continuous graphitic fiber can have a diameter or thickness less than 100 nm.

The mechanical stress-induced molecular alignment (e.g. via shear-induced thinning) is a critically important step in the production of the presently invented unitary graphene-based graphitic fibers due to the surprising observation that shear-induced thinning during GO gel dispensing and deposition onto a solid substrate (as opposed to a liquid coagulation bath) enables the GO molecules to align themselves along a particular direction (e.g. the fiber-axis direction) to achieve a preferred orientation. Further surprisingly, this preferred orientation of graphene molecules is preserved and often further enhanced during the subsequent heat treatment to produce the unitary graphene-based graphitic fiber. Most surprisingly, such a preferred orientation is essential to the eventual attainment of exceptionally high thermal conductivity, high electrical conductivity, high tensile strength, and high Young's modulus of the resulting unitary graphene fiber along the fiber axis direction. These great properties in this desired direction could not be obtained without such a mechanical stress-induced orientation control.

In one embodiment, the graphene oxide gel is obtained by immersing powders or filaments of a graphitic material in an oxidizing liquid medium (e.g. a mixture of sulfuric acid, nitric acid, and potassium permanganate) in a reaction vessel. The starting graphitic material may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. When the graphite powders or filaments are mixed in the oxidizing liquid medium, the resulting slurry initially appears completely dark and opaque. The resulting mass is simply a heterogeneous suspension of solid particles dispersed (not dissolved) in a liquid medium. When the oxidation of graphite proceeds at a reaction temperature for a sufficient length of time under a controlled pH condition, the reacting mass can eventually turn optically translucent, transparent (if sufficiently dilute), or uniform brown color which also looks and behaves like a gel. This heavy oxidation-induced graphene oxide gel is composed of graphene oxide molecules uniformly dissolved in the liquid medium. We observe that even if the initial solid graphite powder particles dispersed in water occupy a proportion as low as 0.1% by weight or lower, the initial suspension is heterogeneous and looks completely dark and opaque. In contrast, the GO gel is a homogeneous solution, containing no discernible discrete solid particles. Even when the GO molecule content exceeds 1% by weight, the GO gel can appear translucent or transparent.

The graphene oxide molecules in the GO gel, prior to any subsequent chemical functionalization or heat treatment, typically have an oxygen content no less than 10% by weight (more typically greater than 20% by weight, further more typically greater than 30% by weight, and most typically from 40-50% by weight) and their molecular weights are typically less than 43,000 g/mole (often less than 4,000 g/mole, but typically greater than 200 g/mole) while in a gel state. The graphene oxide gel is composed of graphene oxide molecules dissolved (not just dispersed) in an acidic medium having a pH value of typically no higher than 5, more typically lower than 3.

Subsequently, the GO gel is formed into a filamentary shape (e.g. dispensed and deposited on a solid substrate) under the influence of mechanical stresses (shear stress, in particular). Subsequently, the liquid component in the GO gel is partially or completely removed to obtain an at least partially dried GO filament containing well-packed and well-aligned living GO molecules.

In one embodiment, the graphene oxide molecules in step (a) contain an oxygen content higher than 30% by weight. In another embodiment, step (c) includes forming a graphene oxide filament having an inter-plane spacing $d_{002}$ of 0.4 nm to 0.7 nm and an oxygen content no less than 20% by weight; and step (d) includes heat-treating the graphene oxide layer to the extent that the inter-plane spacing $d_{002}$ is decreased to a value in the range of 0.3354 nm to 0.36 nm and the oxygen content is decreased to less than 2% by weight.

In still another embodiment, the graphene oxide gel has a viscosity greater than 2,000 cP (centipoise) when measured at 20° C. prior to the shear-induced thinning procedure, but the viscosity is reduced to below 2,000 cP (or even below 1,000 cP) during or after shear-induced thinning. In still another embodiment, the graphene oxide gel has a viscosity greater than 5,000 cP when measured at 20° C. prior to shear-induced thinning, but is reduced to below 5,000 cps (preferably and typically below 2,000 cP or even below 1,000 cP) during or after shear-induced thinning. Preferably, the graphene oxide gel has a viscosity from 500 cP to 500,000 cP when measured at 20° C. prior to shear-induced thinning.

Preferably, the graphene oxide gel has a viscosity less than 5,000 cP (preferably less than 2,000 cP and further preferably less than 1,000 cP) when measured at 20° C. after shear-induced thinning. In general, the graphene oxide gel has a viscosity that decreases by at least 10 times when a shear rate is increased to a finite extent (e.g. by a factor of 10) at 20° C.

The dried GO filament after deposition is then subjected to a properly programmed heat treatment that can be divided into four distinct temperature regimes. The presently invented unitary graphene-based graphitic fiber can be obtained by heat-treating the dried GO filament with a temperature program that covers at least the first regime, more commonly covers the first two regimes, still more commonly the first three regimes, and most commonly all the 4 regimes (the latter being implemented to achieve the highest electric conductivity, highest thermal conductivity, highest strength, and highest modulus):

Regime 1: 100° C.-600° C. (the thermal reduction regime); Oxygen content reduced from typically 30-50% to 5-6%, resulting in a reduction of inter-graphene spacing from approximately 0.6-1.0 nm to approximately 0.4 nm and an increase in the axial thermal conductivity of a GO filament from approximately 100 to 450 W/mK.

Regime 2: 600° C.-1,250° C. (the chemical linking regime); Oxygen content reduced to typically 0.7% (<<1%), resulting in a reduction of inter-graphene spacing to approximately 0.345 nm, an increase in axial thermal conductivity of the filament to 1,000-1,200 W/mK, and/or in-plane electrical conductivity to 2,000-3,000 S/cm.

Regime 3: 1,250° C.-2,000° C. (the ordering and re-graphitization regime); Oxygen content reduced to typically 0.01%, resulting in a reduction of inter-graphene spacing to approximately 0.337 nm (degree of graphitization from 1% to approximately 80%) and improved degree of ordering, an increase in axial thermal conductivity of the filament to >1,600 W/mK, and/or in-plane electrical conductivity to 5,000-7,000 S/cm.

Regime 4: 2,000° C.-3,000° C. (the re-crystallization and perfection regime); Oxygen content reduced to typically from near 0%-0.001%, resulting in a reduction of inter-graphene spacing to approximately 0.3354 nm (degree of graphitization from 80% to nearly 100%) and perfection of crystal structure and orientation, an increase in axial thermal conductivity of the filament to >1,700 W/mK, and axial electrical conductivity to 10,000-20,000 S/cm.

The degree of graphitization, g, was calculated from the X-ray diffraction pattern using Mering's Eq, $d_{002}=0.3354\ g+0.344\ (1-g)$, where $d_{002}$ is the interlayer spacing of graphite or graphene crystal in nm. This equation is valid only when $d_{002}$ is no greater than 0.3440 nm. The unitary graphene-based filament having a $d_{002}$ higher than 0.3440 nm reflects the presence of oxygen-containing functional groups (such as —OH, >O and —COOH) and/or other chemical functional groups, such as —NH$_2$, on graphene molecular plane surfaces that act as a spacer to increase the inter-graphene spacing.

Another structural index that can be used to characterize the degree of ordering of the presently invented unitary graphene filaments or related graphite crystals is the "mosaic spread" value, which is expressed by the full width at half maximum of the (002) or (004) reflection in a X-ray diffraction intensity curve. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our unitary graphene materials (including filaments and films) have a mosaic spread value in this range of 0.2-0.4 (with a heat treatment temperature no less than 2,000° C.). However, some values are in the range of 0.4-0.7 if the ultimate heat treatment temperature (TTT) is between 1,250 and 2,000° C., and in the range of 0.7-1.0 if the TTT is between 600 and 1,250° C.

It may be noted that the unitary graphene filament can be made into a unitary graphene structure, including a graphene single crystal or poly-crystal with few grain boundaries. This unitary graphene structure would contain closely packed and bonded parallel graphene planes having an inter-graphene plane spacing of 0.3354 to 0.40 nm (mostly between 0.3354 and 0.337 nm) and an oxygen content up to 10% by weight (mostly <<1%). This unitary graphene structure can be obtained from heat-treating a graphene oxide gel at a temperature higher than 100° C. (up to 600, 1,250, 2,000, or 3,000° C., depending upon the desired properties), wherein an average mis-orientation angle between two graphene planes is less than 10 degrees, preferably and typically less than 5 degrees. The graphene single crystal refers to the single-grain or single-domain graphene or poly-crystalline structure (but having incomplete grain boundaries) in which most of the graphene planes in all grain(s) are essentially parallel to one another. They are all parallel to the fiber-axis direction. This unitary graphene structure or graphene monolith contains therein no discrete graphite flake or graphene platelet derived from the graphene oxide gel. All graphene oxide molecules have been chemically merged, linked, and integrated into one single integral unit, hence the name "unitary graphene" entity.

The unitary graphene filament typically and preferably has a physical density of at least 1.7 g/cm³ or a porosity level lower than 10%, and more typically and preferably has a physical density of at least 1.8 g/cm³ or a porosity level lower than 5%. The process enables us to produce unitary graphene fiber to reach a physical density most typically in the range of 1.9-2.0 g/cm³, approaching the theoretical density of a perfect graphite single crystal. Yet, no conventional graphite single crystal can be readily produced to have a dimension larger than a few microns (μm). We can produce this giant graphene filament or longer than tens of centimeters that are practically a single crystal. This is most astonishing.

In an embodiment, the graphene oxide gel is obtained from a graphitic material having a maximum original graphite grain size ($L_g$) and the unitary graphene material is a single crystal or a poly-crystal graphene structure having a grain size larger than even the maximum original grain size. This maximum original grain size $L_g$ is the largest length or width of a graphene plane or of a graphite crystallite in a graphite particle prior to being oxidized ($L_g \geq L_a$ and $L_g \geq L_b$, where $L_a$ and $L_b$ are defined later). The heat treatment involves extensive merging and linking of highly reactive GO molecules to form huge graphene planes and huge graphene domains (or grains) that are typically orders of magnitude greater than the original grain sizes.

The heat treatment, or chemical linking and re-graphitization treatment, thermally converts the GO molecules to an integrated graphene entity by chemically merging individual graphene oxide molecules primarily sideway in an edge-to-edge manner to form significantly larger graphene planes, but sometimes also chemically linking with the GO molecules below or above this graphene plane to form a 3-D molecular network. This 3-D molecular network can be broken and re-organized if the final heat treatment occurs at a sufficiently high temperature for an extended length of time.

The graphene oxide gel-derived unitary graphene-based graphitic fibers have the following novel, unique, and unprecedented characteristics:

(1) The unitary graphene filament is an integrated graphene object that is either a graphene single crystal or a poly-crystal having multiple grains (but with incomplete or poorly delineated grain boundaries, or huge grain sizes, having negligible amount of grain boundaries that would otherwise impede flow of electrons and phonons). When made into a filament under the influence of a shear stress (to induce viscosity thinning associated with ordering of GO molecules), the unitary graphene filament is composed of multiple graphene planes essentially all of which are oriented parallel to one another along the fiber axis direction.

(2) In contrast to the conventional spun graphene fibers, which are porous aggregates of discrete graphene sheets twisted together (e.g. those prepared by a spinning-coagulation or constrained-length hydrothermal process), this integrated graphene entity (the unitary graphene-based graphitic fiber) is not an aggregate or stack of multiple discrete graphite flakes or discrete sheets of graphene, GO, or RGO. This is a single graphene entity or monolith. This unitary graphene entity does not contain discrete graphite flakes or discrete graphene sheets dispersed therein that are derived from the GO gel. The GO molecules do not revert back to individual or discrete graphene sheets or graphite flakes. Through chemical inter-linking of GO molecules, re-graphitization, and re-crystallization, the GO molecules and the original graphene planes of hexagonal carbon atoms (that constitute the original graphite particles) have completely lost their original individual identity and have been united into one single entity (unitary body or monolith).

(3) The presently invented graphitic fiber is a neat graphene or graphitic material without any binder, resin, matrix, or glue. The integrated graphene entity is not made by gluing or bonding discrete sheets/platelets together with a binder, linker, or adhesive. Instead, GO molecules in the GO gel are merged, mainly edge-to-edge through joining or forming of chemical bonds with one another, into an integrated graphene entity, without using any externally added linker or binder molecules or polymers.

(4) This unitary or monolithic graphene entity is derived from a GO gel, which is in turn obtained from natural graphite or artificial graphite particles originally having multiple graphite crystallites. Prior to being chemically oxidized, these starting graphite crystallites have an initial length ($L_a$ in the crystallographic a-axis direction), initial width ($L_b$ in the b-axis direction), and thickness ($L_c$ in the c-axis direction). The resulting unitary graphene entity typically has a length or width significantly greater than the $L_a$ and $L_b$ of the original crystallites. Even the individual grains in a poly-crystalline unitary graphene entity have a length or width significantly greater than the $L_a$ and $L_b$ of the original crystallites. They can be as large as the length or width of the unitary graphene fiber itself, not just 2 or 3 times higher than the initial $L_a$ and $L_b$ of the original crystallites. The unitary graphene fiber has grain sizes typically no less than 10 μm, more typically no less than 100 μm, and even more typically no less than 1 cm in the fiber axis direction.

(5) The mechanical stress-induced graphene molecular orientation control, coupled with the nearly perfect graphene planes derived from the well-aligned graphene molecules, enable us to achieve both high strength and high Young's modulus with the presently invented continuous graphitic fibers. This has not been possible with conventional continuous carbon or graphite fibers. For instance, ultra-high strength could only be obtained with PAN-based carbon/graphite fibers, and ultra-high modulus could only be obtained with pitch-based carbon/graphite fibers.

(6) The nearly perfect graphitic crystal structure with essentially all constituent graphene planes being parallel to the fiber axis direction has enabled the presently invented graphitic fibers to exhibit tensile strength and Young's modulus an order of magnitude higher than those of prior art graphene fibers obtained via spinning-coagulation and hydrothermal processes. Further, the electrical conductivity values of our graphitic fibers are typically 2-3 orders of magnitude higher (not just 2-3 times). The thermal conductivity has also reached a value (e.g. 1,000-1,800 W/mK) that has never been obtained by any continuous fibers.

(7) In summary, the continuous unitary graphene fibers, the prior art continuous carbon/graphite fibers from PAN or pitch, and prior art graphene fibers (e.g. prepared from the coagulation route) are three fundamentally different and patently distinct classes of materials in terms of chemical composition, morphology, structure, process of production, and various properties.

a. The presently invented graphitic fiber has a nearly perfect graphitic crystal structure with essentially all constituent graphene planes being parallel to each other and parallel to the fiber axis direction. In addition, the crystallographic c-axis directions of these graphene planes are essentially pointing to the same direction, which does not vary from point to point along the fiber axis direction.

b. In contrast, due to the chiral liquid crystalline nature of the GO suspension used in prior art continuous graphene fibers, these fibers are characterized by having many separate strings of inter-connected graphene domains each having a crystallographic c-axis. This crystallographic c-axis of one domain is significantly different than the crystallographic c-axis of the immediate adjacent graphene domain, which is in turn different than that of the next graphene domain along the same string. The crystallographic c-axis follows a more or less helical pattern along a particular string and the helical pitch (or period) of one string is generally different than the pitch of an adjacent string.

c. The presently invented graphitic fiber is essentially pore-free with porosity level typically less than 1 or 2% by volume, but the prior art graphene fibers are inherently very porous, typically having a porosity level in the range of 10%-80% by volume.

d. The presently invented graphitic fiber has most of the grain sizes being higher than 5 μm, mostly higher than 10 μm, often greater than 100 μm, with many in the centimeter ranges. In contrast, the prior art graphene fibers have most of the grain size or graphene domain size less than 2 μm, mostly less than 1 μm. The PAN- and pitch-based carbon/graphite fibers typically have the length of graphene sheets less than 100 nm, mostly less than 30 nm.

e. The presently invented graphitic fiber is composed of essentially 95-99.5% graphene planes with less than 5% (mostly <1%) disordered structure or defects. In contrast, the PAN- and pitch-based carbon/graphite fibers have a large proportion of disordered and defected zones, typically much higher than 5-10% in volume. Further, all the continuous PAN- and pitch-based carbon/graphite fibers have a core-shell structure with the shell being made up of a hard carbon or amorphous carbon composition. In contrast, the presently invented graphitic fibers do not have a shell or a core-shell structure; all ingredients being graphene planes.

f. Some of the presently invented GO gel-derived fibers can have a finite oxygen content (0.01 to 2% by weight) residing externally, and an inter-graphene spacing of 0.34-0.40 nm (dues to the presence of internal oxygen atoms) unless heat treated at a temperature higher than approximately 1,500° C. All the continuous PAN- and pitch-based carbon/graphite fibers have an inter-graphene spacing less than 0.338 nm.

Another embodiment of the present invention is a process for producing a continuous graphitic fiber from sheets or platelets of pristine graphene, graphene oxide, or reduced graphene oxide. The process comprises (a) preparing a graphene suspension having graphene sheets dispersed in a fluid medium; (b) dispensing and depositing at least a continuous filament of the graphene suspension onto a supporting substrate under the influence of a stress field to induce alignment or ordering of graphene sheets along a filament axis direction; (c) partially or completely removing the fluid medium from the continuous filament to form a continuous graphene fiber containing closely packed and parallel graphene sheets; and (d) heat treating the continuous graphene fiber to form the desired continuous graphitic fiber at a heat treatment temperature higher than 600° C. to an extent that an inter-plane spacing $d_{002}$ is decreased to a value in the range from 0.3354 nm to 0.4 nm. Since these sheets or platelets of pristine graphene, graphene oxide, or reduced graphene oxide are already dead (not living molecules), the continuous graphene fiber would require a much higher final heat treatment temperature to accomplish graphitization and re-crystallization as compared with the fiber derived from living GO molecules disclosed above. This graphitization and re-crystallization are only possible if the graphene fiber contains closely packed and parallel graphene sheets. The requirement of graphene sheets being close-packed and parallel to one another could be met if the graphene suspension is dispensed and deposited under the influence of a proper stress field. This requirement could not be met with the prior art continuous graphene fibers prepared by, for instance, spinning-coagulation.

DESCRIPTION OF THE PREFERRED EMBODIMENTS

Figure 1A:
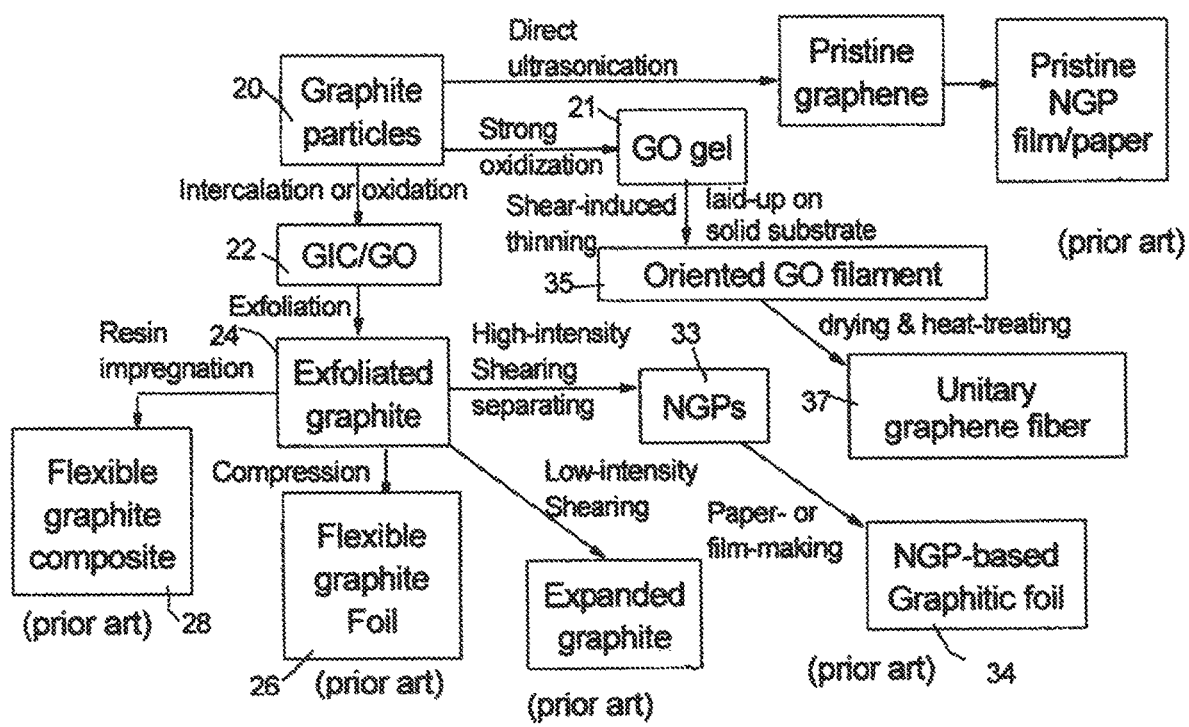
FIG. 1 (a) A flow chart illustrating various prior art processes of producing exfoliated graphite products (flexible graphite foils and flexible graphite composites), along with a process for producing graphene oxide gel 21, oriented GO filament 35, and unitary graphene-based fiber 37; (b) Schematic drawing illustrating the processes for producing conventional paper, mat, film, and membrane of simply aggregated graphite or graphene flakes/platelets. All processes begin with intercalation and/or oxidation treatment of graphitic materials (e.g. natural graphite particles).

One embodiment of the present invention is a continuous graphitic fiber produced from living graphene molecules. The process preferably comprises: (a) preparing a graphene oxide gel having living graphene oxide molecules or functionalized graphene chains dissolved in a fluid medium wherein the graphene oxide molecules contain an oxygen content higher than 10% by weight (preferably higher than 20% by weight); (b) dispensing and depositing at least a continuous filament of graphene oxide gel onto a supporting solid substrate, wherein the dispensing and depositing procedure includes mechanical stress-induced molecular alignment of the living graphene oxide molecules or functionalized graphene chains along a filament axis direction; (c) partially or completely removing the fluid medium from said continuous filament to form a continuous graphene oxide fiber, wherein said graphene oxide fiber has an inter-plane spacing $d_{002}$ of 0.4 nm to 1.2 nm as determined by X-ray diffraction and an oxygen content no less than 10% by weight; and (d) heat treating the continuous graphene oxide fiber to form the continuous graphitic fiber at a heat treatment temperature higher than 100° C. (preferably >600° C. and more preferably >1,000° C.) to the extent that an inter-plane spacing $d_{002}$ is decreased to a value in the range of 0.3354 nm to 0.4 nm and the oxygen content is decreased to less than 5% by weight (preferably less than 2%).

Since step (b) involves dispensing and depositing GO gel onto a solid substrate, this process has essentially excluded any spinning-coagulation process that involves spinning liquid crystalline GO solution into a coagulation bath containing a liquid non-solvent. Coagulation inherently randomizes the orientation of graphene sheets, which is in contrast to our intent to achieve preferred orientations of the graphene planes of carbon atoms.

It is important to note that multiple filaments can be produced concurrently if we dispense and form multiple continuous filaments of GO gel onto a supporting substrate. There is no limitation as to how many filaments can be generated at the same time. Hundreds, thousands, or tens of thousands of filaments can be made and combined into a continuous yarn when or after these filaments are made.

In a more preferred embodiment, step (c) includes forming a graphene oxide filament having an inter-plane spacing $d_{002}$ of 0.4 nm to 0.7 nm and an oxygen content no less than 20% by weight; and step (d) includes heat-treating the graphene oxide filament to an extent that an inter-plane spacing $d_{002}$ is decreased to a value in the range of 0.3354 nm to 0.36 nm and the oxygen content is decreased to less than 2% by weight (most preferably between 0.001% to 0.01% by weight).

The unitary graphene-based graphitic fiber is obtained from heat-treating a graphene oxide gel filament at a temperature higher than 100° C. (preferably higher than 600° C., more preferably higher than 1,250° C., further preferably higher than 2,000° C., and advantageously higher than 2,500° C. if a perfect or nearly perfect graphene crystal is desired) and contains chemically bonded graphene molecules. These planar aromatic molecules or graphene planes (hexagonal structured carbon atoms) are parallel to one another. The lengths of the un-interrupted planes along the fiber axis are huge, typically several times or even orders of magnitude larger than the maximum crystallite dimension (or maximum constituent graphene plane dimension) of the starting graphite particles. The presently invented unitary graphene filament is a "giant griphene crystal" or "giant graphene fibers" having all constituent graphene planes being essentially parallel to one another along the fiber axis. This is a unique and new class of material that has not been previously discovered, developed, or suggested to possibly exist.

The graphene oxide gel is a very unique and novel class of material that surprisingly has great cohesion power (self-bonding, self-polymerizing, and self-crosslinking capability) and adhesive power (capable of chemically bonding to a wide variety of solid surfaces). These characteristics have not been taught or hinted in the prior art. The GO gel is obtained by immersing powders of a starting graphitic material in an oxidizing liquid medium (e.g. a mixture of sulfuric acid, nitric acid, and potassium permanganate) in a reaction vessel. The starting graphitic material may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

When the starting graphite powders are dispersed in the oxidizing liquid medium, the resulting slurry (heterogeneous suspension) initially appears completely dark and opaque. When the oxidation of graphite proceeds at a reaction temperature for a sufficient length of time under a controlled pH condition, the reacting mass can eventually become a homogeneous solution having no discernible or visually identifiable dispersed solid particle (as opposed to the initially heterogeneous suspension that contain identifiable solid particles). The solution can be optically translucent or transparent or brown-colored, which also looks and behaves like a polymer gel. This heavy oxidation-induced graphene oxide gel is composed of graphene oxide molecules dissolved in the liquid medium. The graphene oxide molecules, prior to any subsequent heat treatment, have an oxygen content typically no less than 10-20% by weight (typically from 40-50% by weight) and their molecular weights are typically less than 43,000 g/mole (often less than 4,000 g/mole, but typically greater than 200 g/mole) while in a gel state. The graphene oxide gel is composed of graphene oxide molecules dissolved in an acidic medium having a pH value of typically no higher than 5.

Figure 9A:
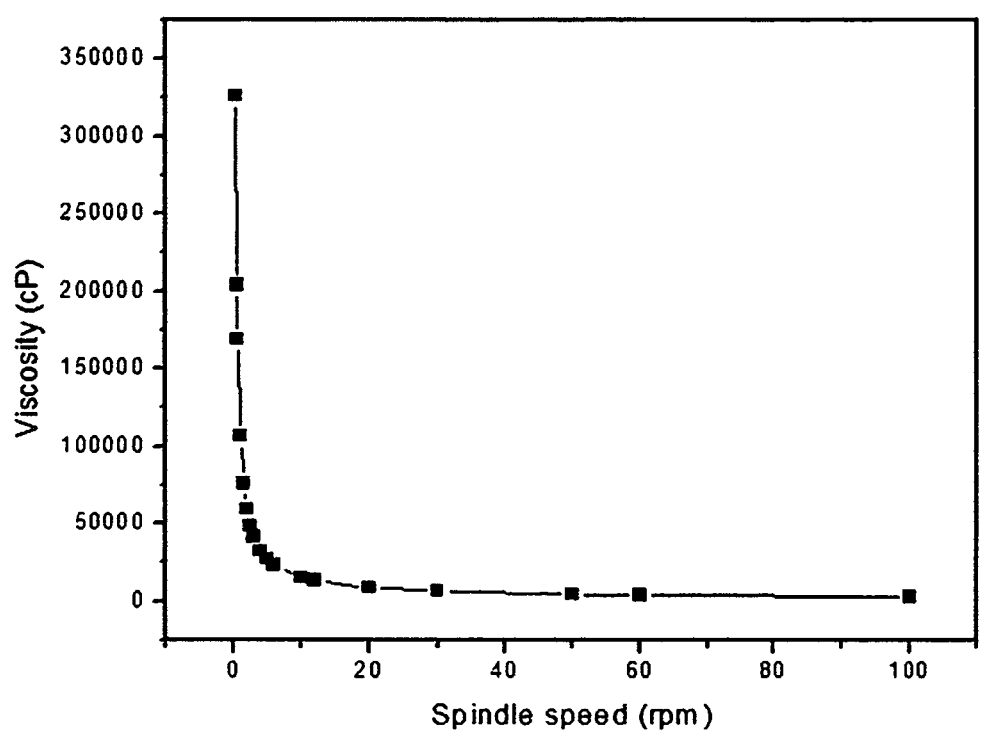
FIG. 9 Viscosity values of graphene gel plotted as a function of viscometer spindle speed (proportional to a shear rate): (a) linear-linear scale, (b) log-linear scale, and (c) log-log scale.
Figure 9B:
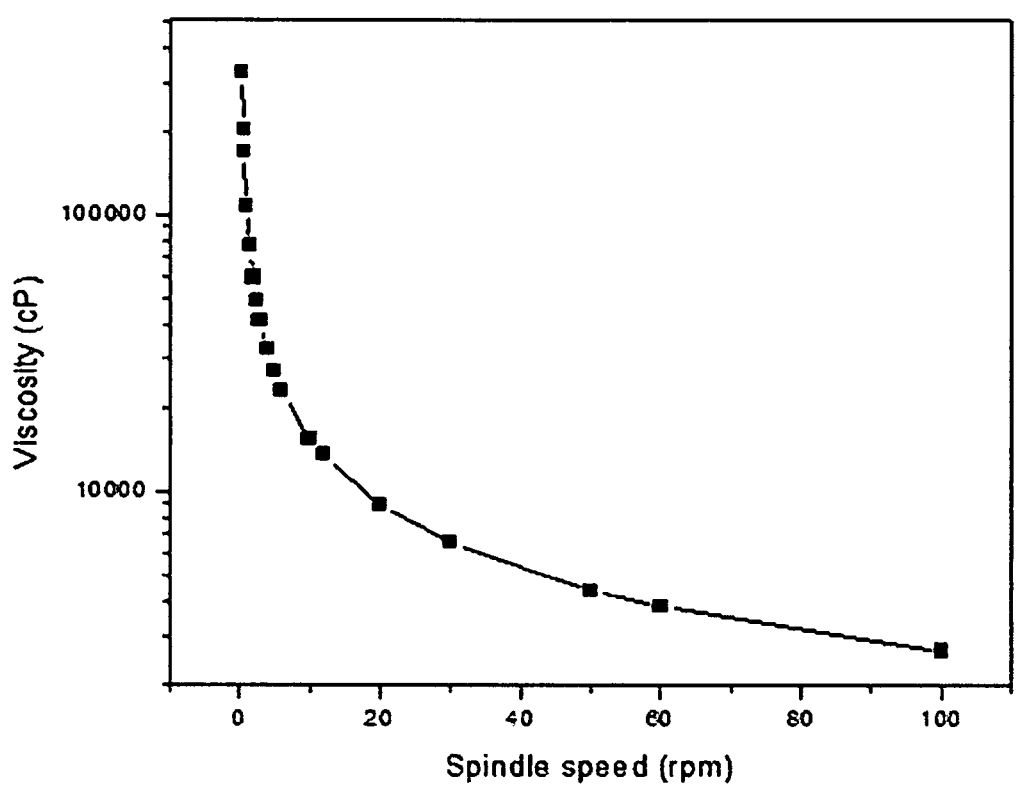
Figure 9C:
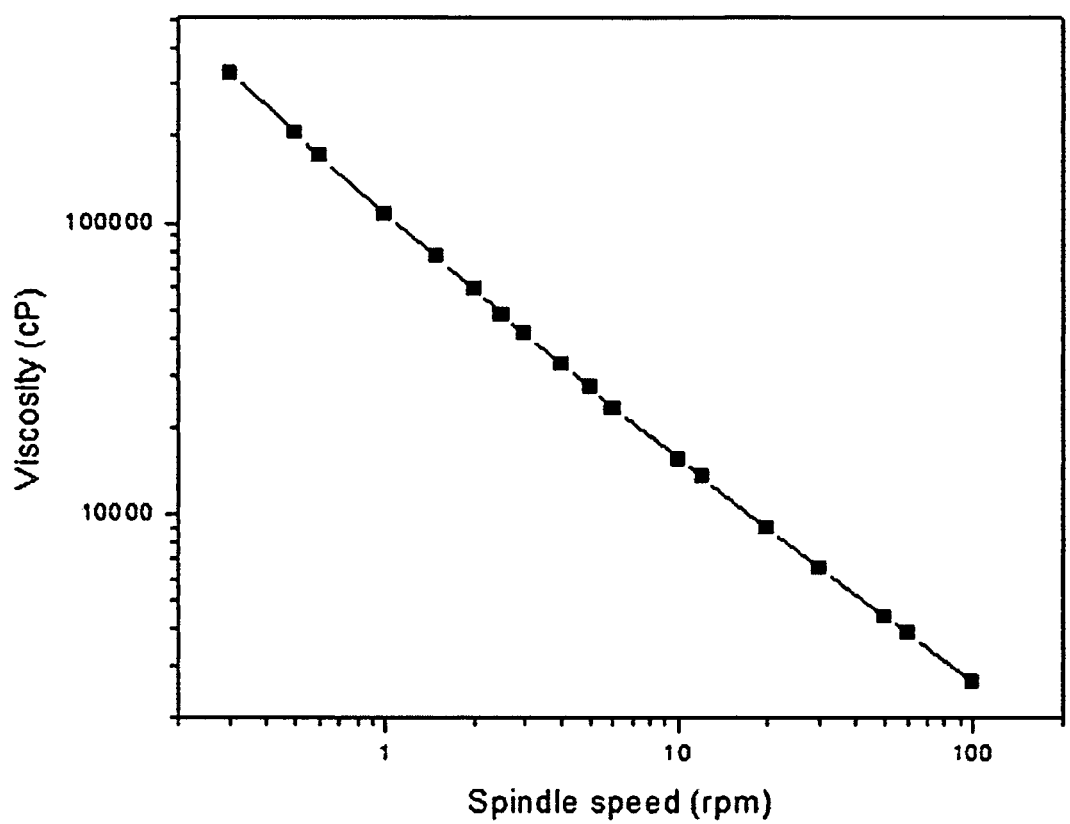

The graphene oxide gel has a typical viscosity from 500 centipoise (cP) to 500,000 cP when measured at 20° C. prior to shear-induced thinning. The viscosity is more typically greater than 2,000 cP and less than 300,000 cP when measured at 20° C. prior to the shear-induced thinning procedure. Preferably, the viscosity of the GO gel as a precursor to unitary graphene material is in the range of 2,000-50,000 cP. Preferably, the GO gel is subjected to a shear stress field that the viscosity is reduced to below 2,000 cP (or even below 1,000 cP) during or after shear-induced thinning. In an embodiment, the graphene oxide gel has a viscosity greater than 5,000 cP when measured at 20° C. prior to shear-induced thinning, but is reduced to below 5,000 cP (preferably and typically below 2,000 cP or even below 1,000 cP) during or after shear-induced thinning. The viscosity data measured at 20° C., shown in FIGS. 9(a), 9(b), and 9(c) as an example, clearly indicate that even an ultra-high viscosity value (e.g., 300,000 cP) can be reduced down to 1,000-2,000 cP with a sufficiently high shear rate. This is a reduction by more than 2 orders of magnitude, a highly unexpected observation. The straight line of the data when plotted in a log-log scale indicates a shear thinning fluid flow behavior.

In step (b), the GO gel is formed into a filamentary shape preferably under the influence of a shear stress or strain. One example of such a shearing procedure is casting or coating a thin string of GO gel (gel-like fluid) using a dispensing or extrusion machine. This procedure is similar to coating a very narrow-width strip or filament of varnish, paint, or coating onto a solid substrate. The roller, "doctor's blade", or wiper creates a shear stress when the thin filament is being shaped, or when a relative motion is conducted between the roller/blade/wiper and the supporting substrate. Quite unexpectedly and significantly, such a shearing action reduces the effective viscosity of the GO gel and enables the planar graphene oxide molecules to well align along, for instance, the shearing direction or the filament axis direction. Further surprisingly, such a molecular alignment state or preferred orientation is not disrupted when the liquid components in the GO gel are subsequently removed to form a well-packed GO filament that is at least partially dried. The dried GO filament has a high birefringence coefficient between the axial direction and the transverse direction.

This mechanical stress/strain also enables all the constituent grains or graphene domains along a graphitic fiber remain substantially parallel to one another. In other words, not only the graphene planes in a particular domain are parallel to one another, they are also parallel to the graphene planes in the adjacent domain. The crystallographic c-axes of these two sets of graphene planes are pointing along substantially identical direction. In other words, the domains or grains do not follow a helical or twisting pattern. Thus, the continuous graphitic fiber contains a first graphene domain containing bonded graphene planes parallel to one another and having a first crystallographic c-axis, and a second graphene domain containing bonded graphene planes parallel to one another and having a second crystallographic c-axis wherein the first crystallographic c-axis and the second crystallographic c-axis are inclined with respect to each other at an angle less than 10 degrees (mostly less than 5% and even more often less than 1 degree).

Figure 4:
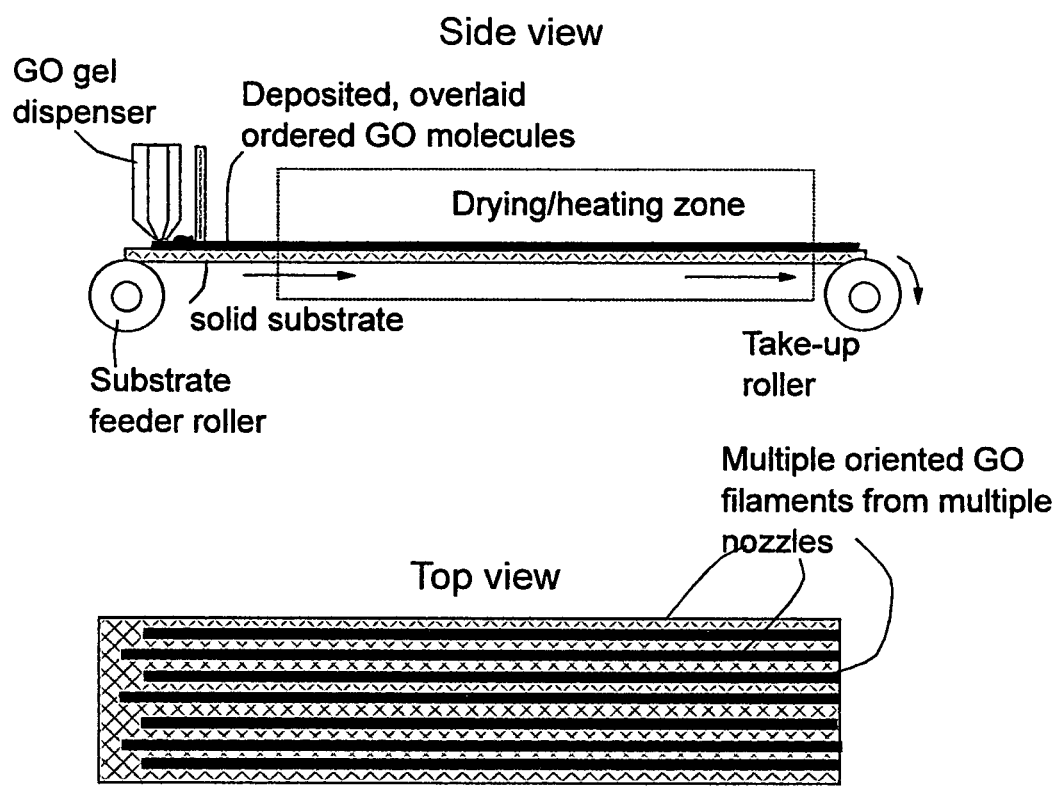
FIG. 4 Schematic diagram illustrating a process of producing multiple continuous graphitic fibers from living GO molecules dispensed through multiple nozzles under the influence of shear stresses or strains.

As schematically illustrated in FIG. 4, multiple dispensing devices or one dispensing device with multiple nozzles may be used to dispense multiple filaments of GO gel onto a moving substrate in a continuous manner. A feeder roller provides a solid substrate (e.g. plastic film) that moves from the left side to the right side of FIG. 4 and is collected on a take-up roller. A drying/heating zone may be implemented to remove most of the liquid component (e.g. water) from the GO gel filaments prior to being collected on the winding roller. Multiple filaments of GO gel may be laid onto the substrate. This deposition step should preferably involve a local shear stress/strain exerted on the GO gel filaments for the purpose of assembling the planar GO molecules into an ordered and aligned structure.

For instance, the relative movement between the substrate (carrying the GO gel filament mass) and a blade/wiper may be sufficient to force the planar GO molecules to align themselves along the filament axis direction (or the substrate moving direction). The planar GO molecules are self-assembled to be parallel to the substrate surface plane in an ordered and overlaying manner. Such an ordered packing or self-assembled configuration unexpectedly proves to be conducive to subsequent heat-induced chemical linking and merging between GO molecules and further re-graphitization and re-crystallization of graphitic domains. This is in stark contrast to the coagulation procedure in the prior art graphene fiber production process, wherein coagulation inherently precipitates out isolated GO sheets that are separated from one another, eliminating the possibility of packing and aligning these GO sheets for effective chemical linking and re-graphitization.

This dried GO filament is then subjected to a properly programmed heat treatment that can be divided into four distinct heat treatment temperature (HTT) regimes:

Regime 1 (approximately 100° C.-600° C.): In this temperature range (the thermal reduction regime), the GO filament primarily undergoes thermally-induced reduction reactions, leading to a reduction of oxygen content from typically 30-50% (as dried) to 5-6%. This treatment also results in a reduction of inter-graphene spacing from approximately 0.6-1.0 nm (as dried) to approximately 0.4 nm and an increase in axial thermal conductivity from approximately 50-100 W/mK to 450 W/mK. Even with such a low temperature range, some chemical linking occurs. The GO molecules remain well-aligned, but the inter-GO spacing remains relatively large (0.4 nm or larger). Many O-containing functional groups and other functional groups survive.

Regime 2 (approximately 600° C.-1,250° C.): In this chemical linking regime, extensive chemical combination, polymerization (combination of GO chains), and cross-linking between adjacent GO or functionalized molecules occur. The oxygen content is reduced to typically 0.7% (<<1%), resulting in a reduction of inter-graphene spacing to approximately 0.345 nm. This implies that some initial graphitization (or re-graphitization) has already begun at such a low temperature, in stark contrast to conventional graphitizable materials (such as carbonized PAN fiber) that typically require a temperature as high as 2,500° C. to initiate effective graphitization. This is another distinct feature of the presently invented unitary graphene-based graphitic fibers and its production processes. These chemical linking reactions result in an increase in axial thermal conductivity of a unitary graphene-based fiber to 1,000-1,200 W/mK, and/or axial electrical conductivity to the range of 3,000-5,000 S/cm.

Regime 3 (approximately 1,250° C.-2,000° C.): In this ordering and re-graphitization regime, extensive graphitization or graphene plane merging occurs, leading to significantly improved degree of structural ordering. As a result, the oxygen content is reduced to typically 0.01% and the inter-graphene spacing to approximately 0.337 nm (achieving degree of graphitization from 1% to approximately 80%, depending upon the actual HTT and length of time). The improved degree of ordering is also reflected by an increase in axial thermal conductivity to >1,600 W/mK, and/or axial electrical conductivity to 5,000-8,000 S/cm.

Regime 4 (approximately 2,000° C.-3,000° C. or higher): In this re-crystallization and perfection regime, extensive movement and elimination of grain boundaries and other defects occur, resulting in the formation of perfect or nearly perfect single crystals, or poly-crystalline graphene crystals with incomplete grain boundaries or huge grains (these grains can be orders of magnitude larger than the original grain sizes of the starting graphite particles for GO gel production. The oxygen content is essentially eliminated, typically 0%-0.001%. The inter-graphene spacing is reduced to down to approximately 0.3354 nm (degree of graphitization from 80% to nearly 100%), corresponding to that of a perfect graphite single crystal. Quite interestingly, the graphene single crystal or poly-crystal has all the graphene planes being closely packed and bonded, and all aligned along one direction, a perfect orientation. Such a perfectly oriented structure has not been produced even with the highly oriented pyrolytic graphite (HOPG) being subjected concurrently to an ultra-high temperature (3,400° C.) under an ultra-high pressure (300 Kg/cm$^2$). The unitary graphene-based continuous fiber can achieve such a highest degree of perfection with a significantly lower temperature and an ambient (or slightly higher compression) pressure. The unitary graphene-based graphitic fiber thus obtained exhibits an axial thermal conductivity up to >1,800 W/mK, and electrical conductivity to 10,000-20,000 S/cm. No continuous fiber of any type thus far has exhibited these exceptional conductivity values.

The presently invented unitary graphene material can be obtained by heat-treating the dried GO mass with a temperature program that covers at least the first regime (typically requiring 1-4 hours in this temperature range if the temperature never exceeds 600° C.), more commonly covers the first two regimes (1-2 hours preferred), still more commonly the first three regimes (preferably 0.5-2.0 hours in Regime 3), and most commonly all the 4 regimes (Regime 4, for 0.2 to 1 hour, may be implemented to achieve the highest conductivity and Young's modulus).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The unitary graphene material or lightly oxidized graphite crystalline material having a $d_{002}$ higher than 0.3440 nm reflects the presence of oxygen-containing functional groups (such as —OH, >O, and —COOH on graphene molecular plane surfaces) that act as a spacer to increase the inter-graphene spacing. Conventional continuous carbon/graphite fibers do not have these oxygen-containing groups residing in the interior of the fiber.

Another structural index that can be used to characterize the degree of ordering of the presently invented unitary graphene material and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our unitary graphene materials have a mosaic spread value in this range of 0.2-0.4 (with a heat treatment temperature no less than 2,000° C.). However, some values are in the range of 0.4-0.7 if the highest heat treatment temperature (TTT) is between 1,250° C. and 2,000° C., and in the range of 0.7-1.0 if the TTT is between 600 and 1,250° C.

The heat treatment temperature conditions for GO are such that the unitary graphene-based fiber is relatively pore-free having a physical density of at least 1.6 g/cm$^3$ or a porosity level lower than 10%. Under more typical processing conditions, the unitary graphene-based graphitic fiber has a physical density of at least 1.7 g/cm$^3$ or a porosity level lower than 5%. In most cases, the fiber has a physical density greater than 1.8 g/cm$^3$ or a porosity level less than 2%. The chemically bonded graphene planes in the unitary graphene oxide fiber typically contain a combination of sp$^2$ and sp$^3$ electronic configurations (particularly for those unitary graphene materials prepared with the maximum treatment temperature lower than 2,000° C.). Above such a high temperature, most of the bonding in the graphene planes is sp$^2$ and the bonding between graphene planes is van der Waals forces.

The graphene oxide (GO) gel-derived unitary graphene-based graphitic fibers and related processes have the following characteristics and advantages:

(1) The unitary graphene-based fiber is an integrated graphene phase that is either a graphene single crystal or a poly-crystal having multiple grains with exceptionally large grains or incomplete grain boundaries. When made into a filament under a desired shearing stress field condition, the fiber is composed of very long, chemically bonded graphene planes that are essentially oriented parallel to one another. The grains in a graphene poly-crystal have very poorly delineated or incomplete grain boundaries. These grains are essentially a single grain with some residual demarcation lines. Such type of graphene poly-crystal is best described as a graphene single crystal with some aligned but sporadic defects. These defects can be eliminated to form a practically perfect single crystal if the unitary graphene structure is allowed to undergo re-crystallization at a temperature higher than approximately 2,500° C. for a sufficient length of time. This conclusion was drawn after an extensive investigation using a combination of SEM, TEM, selected area diffraction (with a TEM), X-ray diffraction, atomic force microscopy (AFM), Raman spectroscopy, and FTIR.

(2) The yarn-like graphene fibers prepared by the prior art processes (e.g. spinning-coagulation) are a simple, un-bonded aggregate/stack of multiple discrete platelets or sheets of graphene, GO, or RGO that are mechanically fastened. In contrast, the unitary graphene fiber of the present invention is a fully integrated, single graphene entity or monolith containing no discrete sheets or platelets derived from the GO gel. All the GO planes are covalently bonded along the fiber axis direction and at least bonded with van der Waals forces in a transverse direction (perpendicular to the fiber axis).

(3) With these conventional processes, the constituent graphene sheets of the resulting yarn-like fibers remain as discrete flakes/sheets/platelets that can be easily discerned or clearly observed. In a cross-sectional view under a SEM (e.g. FIG. 2(c)), these discrete sheets are relatively random in orientation and have many pores between these discrete sheets.

In contrast, the preparation of the presently invented unitary graphene fiber structure involves heavily oxidizing the original graphite particles, to the extent that practically every one of the original graphene planes has been oxidized and isolated from one another to become individual molecules that possess highly reactive functional groups (e.g.—OH, >O, and —COOH) at the edge and, mostly, on graphene planes as well. These individual hydrocarbon molecules (containing elements such as O and H, in addition to carbon atoms) are dissolved in the reaction medium (e.g. mixture of water and acids) to form a gel-like mass, herein referred to as the GO gel. This gel is then dispensed and formed into a thin continuous filament onto a solid substrate surface under shear stress field conditions. The liquid components are then removed to form a dried GO filament. When heated, these highly reactive molecules react and chemically join with one another mostly in lateral directions along graphene planes (in an edge-to-edge manner) and, in some cases, between graphene planes as well.

Figure 3A:
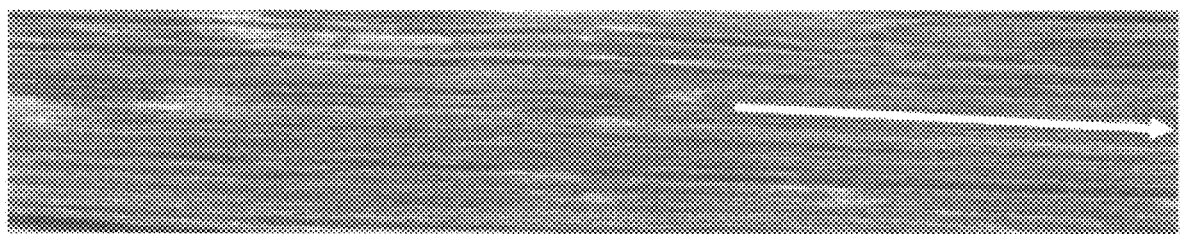
FIG. 3 (a) A SEM image of a GO-derived graphene fiber. Original graphite particles having multiple graphene planes (with a length/width of 30 nm-2 μm) were oxidized, exfoliated, re-oriented, and seamlessly merged into continuous-length graphene planes; (b) A SEM image of a cross-section of a conventional graphene paper/film prepared from discrete graphene sheets/platelets using a paper-making process (e.g. vacuum-assisted filtration). The image shows many discrete graphene sheets being folded or interrupted (not integrated), with orientations not parallel to the film/paper surface and having many defects or imperfections; (c) Schematic drawing to illustrate the formation process of a unitary graphene fiber composed of multiple graphene planes that are parallel to one another and are well-bonded in the thickness-direction or crystallographic c-axis direction; (d) One plausible chemical linking mechanism (only 2 GO molecules are shown as an example; a large number of GO molecules can be chemically linked together to form a unitary graphene fiber).
Figure 3A:
Figure 3B:
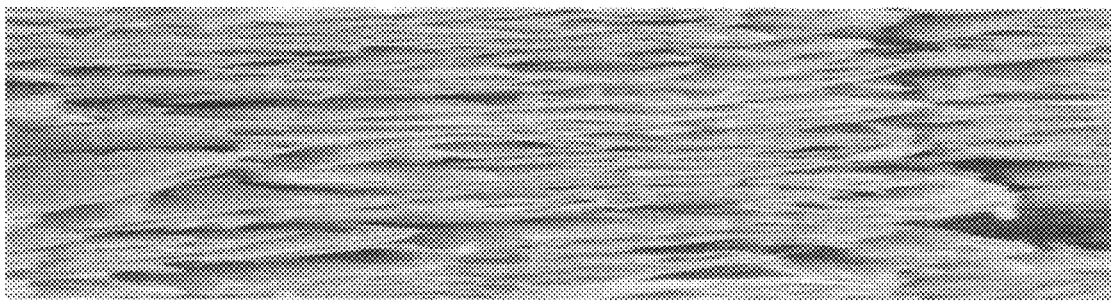
Figure 3B:
Figure 3C:
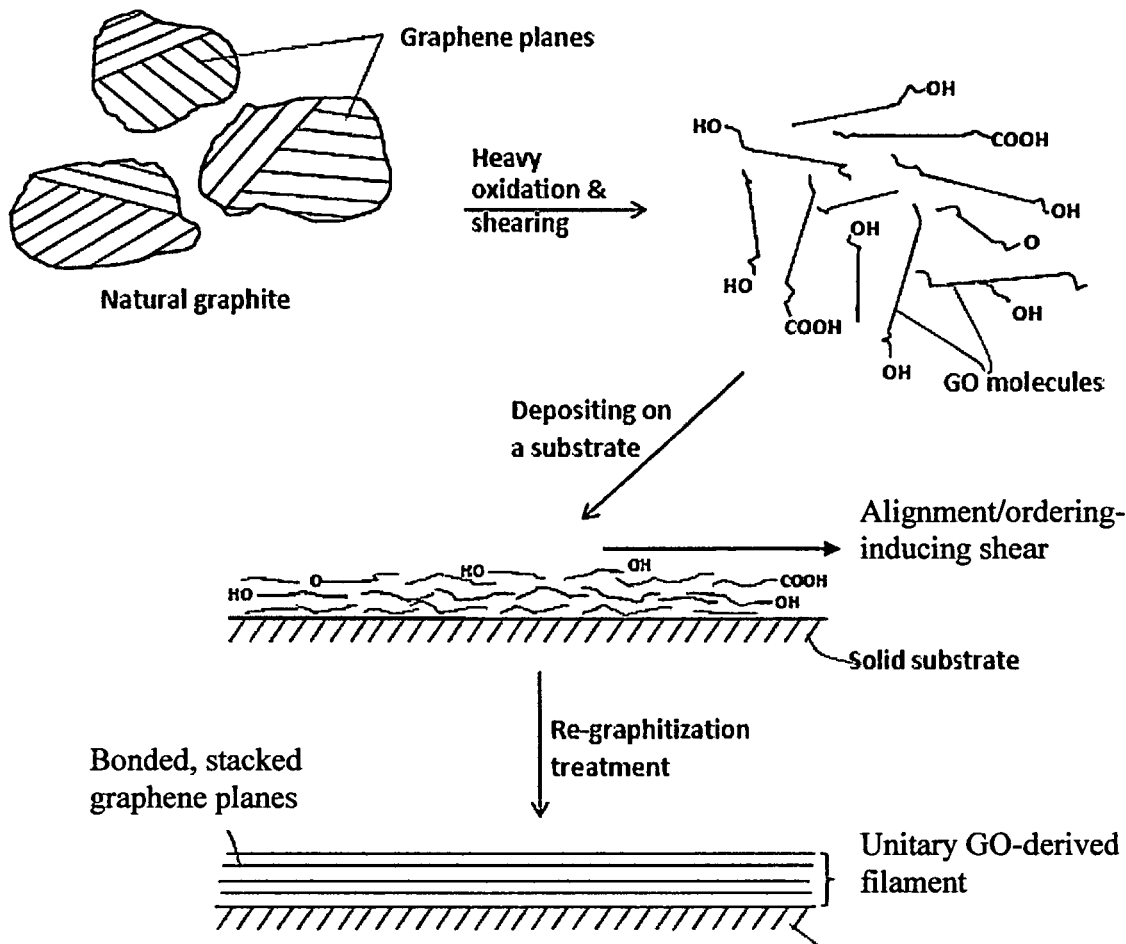
Figure 3D:
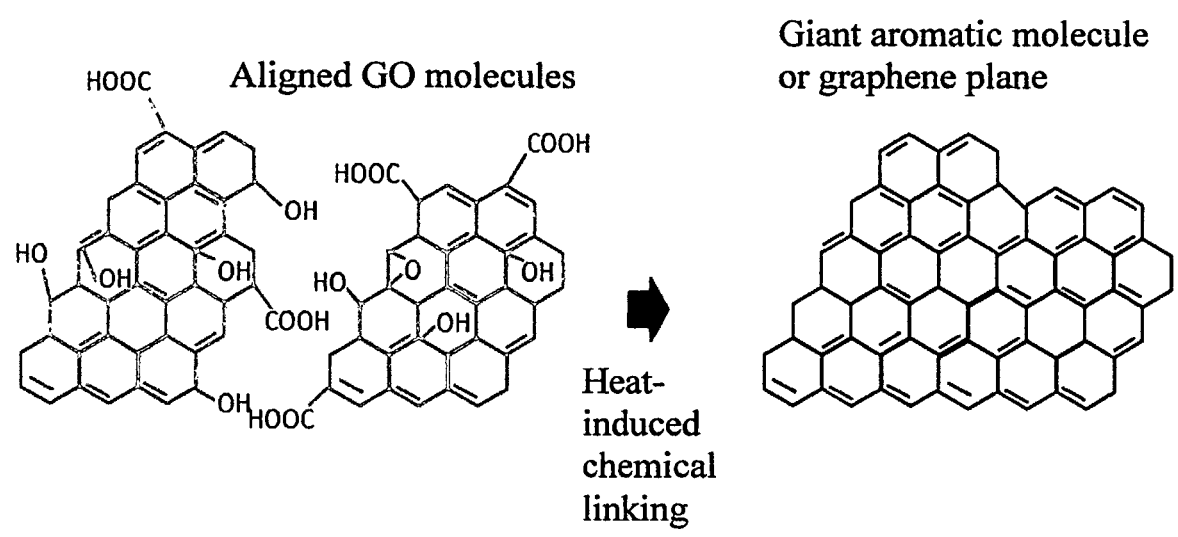

Illustrated in FIG. 3(d) is a plausible chemical linking mechanism where only 2 aligned GO molecules are shown as an example, although a large number of GO molecules can be chemically linked together to form a unitary graphene layer. Further, chemical linking could also occur face-to-face, not just edge-to-edge. These linking and merging reactions proceed in such a manner that the molecules are chemically merged, linked, and integrated into one single entity or monolith. The molecules completely lose their own original identity and they no longer are discrete sheets/platelets/flakes. There is only one single layer-like structure (unitary graphene entity) that is one huge molecule or just a network of interconnected giant molecules with an essentially infinite molecular weight. This may also be described as a graphene single crystal (with only one grain in the entire structure or entity, or a poly-crystal (with several large-sized grains, but typically no discernible, well-defined grain boundaries). All the constituent graphene planes are very large in lateral dimensions (length and width) and, if produced under shear stress conditions and heat-treated at a higher temperature (e.g. >1,250° C. or much higher), these graphene planes are essentially parallel to one another.

In-depth studies using a combination of SEM, TEM, selected area diffraction, X-ray diffraction, AFM, Raman spectroscopy, and FTIR indicate that the graphene monolith is composed of several huge graphene planes (with length typically >>100 μm, more typically >>1 mm, and often >>1 cm). These giant graphene planes are stacked and bonded along the thickness direction (crystallographic c-axis direction) often through not just the van der Waals forces (as in conventional graphite crystallites), but also covalent bonds (if the ultimate heat treatment temperature is lower than 1,500-2,000° C.). Not to be limited by theory, but Raman and FTIR spectroscopy studies appear to indicate the co-existence of $sp^2$ (dominating) and $sp^3$ (weak but existing) electronic configurations in these GO-derived fibers treated at lower temperatures, not just the conventional $sp^2$ in graphite.

(4) This integrated graphene entity is not made by gluing or bonding discrete flakes/platelets together with a resin binder, linker, or adhesive. Instead, GO molecules in the GO gel are merged through joining or forming of covalent bonds with one another, into an integrated graphene entity, without using any externally added linker or binder molecules or polymers. Hence, the graphitic fiber of the present invention is a neat graphene structure, containing and involving no binder, no adhesive, and no matrix material.

(5) This unitary or monolithic graphene entity typically has the crystallographic c-axis in all grains being essentially parallel to each other. This entity is derived from a GO gel, which is in turn obtained from natural graphite or artificial graphite particles originally having multiple graphite crystallites. Prior to being chemically oxidized, these starting graphite crystallites have an initial length ($L_a$ in the crystallographic a-axis direction), initial width ($L_b$ in the b-axis direction), and thickness ($L_c$ in the c-axis direction). Upon heavy oxidation, these initially discrete graphite particles are chemically transformed into highly aromatic graphene oxide molecules having a significant concentration of edge- or surface-borne functional groups (e.g.—OH, >C=O, and —COOH, etc.). These aromatic GO molecules in the GO gel have lost their original identity of being part of a graphite particle or flake. Upon removal of the liquid component from the GO gel, the resulting GO molecules are stacked upon one another in a relatively ordered manner if the GO gel was under the influence of shear stresses during or after dispensing/depositing operation. Upon heat treatment, these GO molecules are chemically merged and linked into a unitary or monolithic graphene entity that is highly ordered, essentially a single crystal or poly-crystal with huge grains when the temperature is sufficiently high.

The resulting unitary graphene entity typically has a length significantly greater than the $L_a$ and $L_b$ of the original crystallites. The grain size (length) of this unitary graphene-based fiber is typically greater than the $L_a$ and $L_b$ of the original crystallites. They can be several orders of magnitude (not just 2 or 3 times) higher than the initial $L_a$ and $L_b$ of the original graphite crystallites.

(6) Due to these unique chemical compositions (including oxygen content), morphology, crystal structure (including inter-graphene spacing), and microstructural features (e.g. defects, incomplete or lack of grain boundaries, chemical bonding and no gap between graphene sheets, and no interruptions in graphene planes), the graphene oxide gel-derived unitary or monolithic graphene-based fiber has a unique combination of outstanding thermal conductivity, electrical conductivity, tensile strength, and Young's modulus. No prior art continuous fiber of any material type even comes close to these combined properties.

The aforementioned features are further described and explained in detail as follows: As illustrated in FIG. 1(b), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene planes or basal planes, are weakly bonded together in their thickness direction (crystallographic c-axis direction) by van der Waals forces and groups of these graphene layers are arranged in crystallites that are typically oriented in different directions. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. In particles of natural graphite, $L_a$ and $L_b$ are typically in the range of 0.5 μm-100 μm and the $L_c$ is typically less than 500 nm and often less than 100 nm. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1(b), different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. In a typical process, particles of natural graphite (e.g. 100 in FIG. 1(*b*)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 30-800 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications.

The upper left portion of FIG. 1(*a*) shows a flow chart that illustrates the prior art processes used to fabricate flexible graphite foils and the resin-impregnated flexible graphite composite. The processes typically begin with intercalating graphite particles 20 (e.g., natural graphite or synthetic graphite) with an intercalant (typically a strong acid or acid mixture) to obtain a graphite intercalation compound 22 (GIC). After rinsing in water to remove excess acid, the GIC becomes "expandable graphite." The GIC or expandable graphite is then exposed to a high temperature environment (e.g., in a tube furnace preset at a temperature in the range of 800-1,050° C.) for a short duration of time (typically from 15 seconds to 2 minutes). This thermal treatment allows the graphite to expand in its c-axis direction by a factor of 30 to several hundreds to obtain a worm-like vermicular structure 24 (graphite worm), which contains exfoliated, but unseparated graphite flakes with large pores interposed between these interconnected flakes. An example of graphite worms is presented in FIG. 2(*a*).

In one prior art process, the exfoliated graphite (or mass of graphite worms) is re-compressed by using a roll-pressing technique to obtain flexible graphite foils (26 in FIG. 1(*a*) or 106 in FIG. 1(*b*)), which are typically much thicker than 100 μm. An SEM image of a cross-section of a flexible graphite foil is presented in FIG. 2(*b*), which shows many graphite flakes with orientations not parallel to the flexible graphite foil surface and there are many defects and imperfections.

Largely due to these mis-orientations of graphite flakes and the presence of defects, commercially available flexible graphite foils normally have an in-plane electrical conductivity of 1,000-3,000 S/cm, through-plane (thickness-direction or Z-direction) electrical conductivity of 15-30 S/cm, in-plane thermal conductivity of 140-300 W/mK, and through-plane thermal conductivity of approximately 10-30 W/mK. These defects and mis-orientations are also responsible for the low mechanical strength (e.g. defects are potential stress concentration sites where cracks are preferentially initiated). In another prior art process, the exfoliated graphite worm 24 may be impregnated with a resin and then compressed and cured to form a flexible graphite composite 28, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nano graphene platelets 33 (NGPs) with all the graphene platelets thinner than 100 nm, mostly thinner than 10 nm, and, in many cases, being single-layer graphene (also illustrated as 112 in FIG. 1(*b*). An NGP is composed of a graphene sheet or a plurality of graphene sheets with each sheet being a two-dimensional, hexagonal structure of carbon atoms.

Further alternatively, with a low-intensity shearing, graphite worms tend to be separated into the so-called expanded graphite flakes (108 in FIG. 1(*b*) having a thickness >100 nm. These flakes can be formed into graphite paper or mat 110 using a paper- or mat-making process. This expanded graphite paper or mat 110 is just a simple aggregate or stack of discrete flakes having defects, interruptions, and mis-orientations between these discrete flakes.

For the purpose of defining the geometry and orientation of an NGP, the NGP is described as having a length (the largest dimension), a width (the second largest dimension), and a thickness. The thickness is the smallest dimension, which is no greater than 100 nm, preferably smaller than 10 nm in the present application. When the platelet is approximately circular in shape, the length and width are referred to as diameter. In the presently defined NGPs, both the length and width can be smaller than 1 μm, but can be larger than 200 μm.

A mass of multiple NGPs (including discrete sheets/platelets of single-layer and/or few-layer graphene, 33 in FIG. 1(*a*)) may be made into a graphene film/paper (34 in FIG. 1(*a*) or 114 in FIG. 1(*b*)) using a film- or paper-making process. FIG. 3(*b*) shows a SEM image of a cross-section of a graphene paper/film prepared from discrete graphene sheets using a paper-making process. The image shows the presence of many discrete graphene sheets being folded or interrupted (not integrated), most of platelet orientations being not parallel to the film/paper surface, the existence of many defects or imperfections.

Figure 1B:
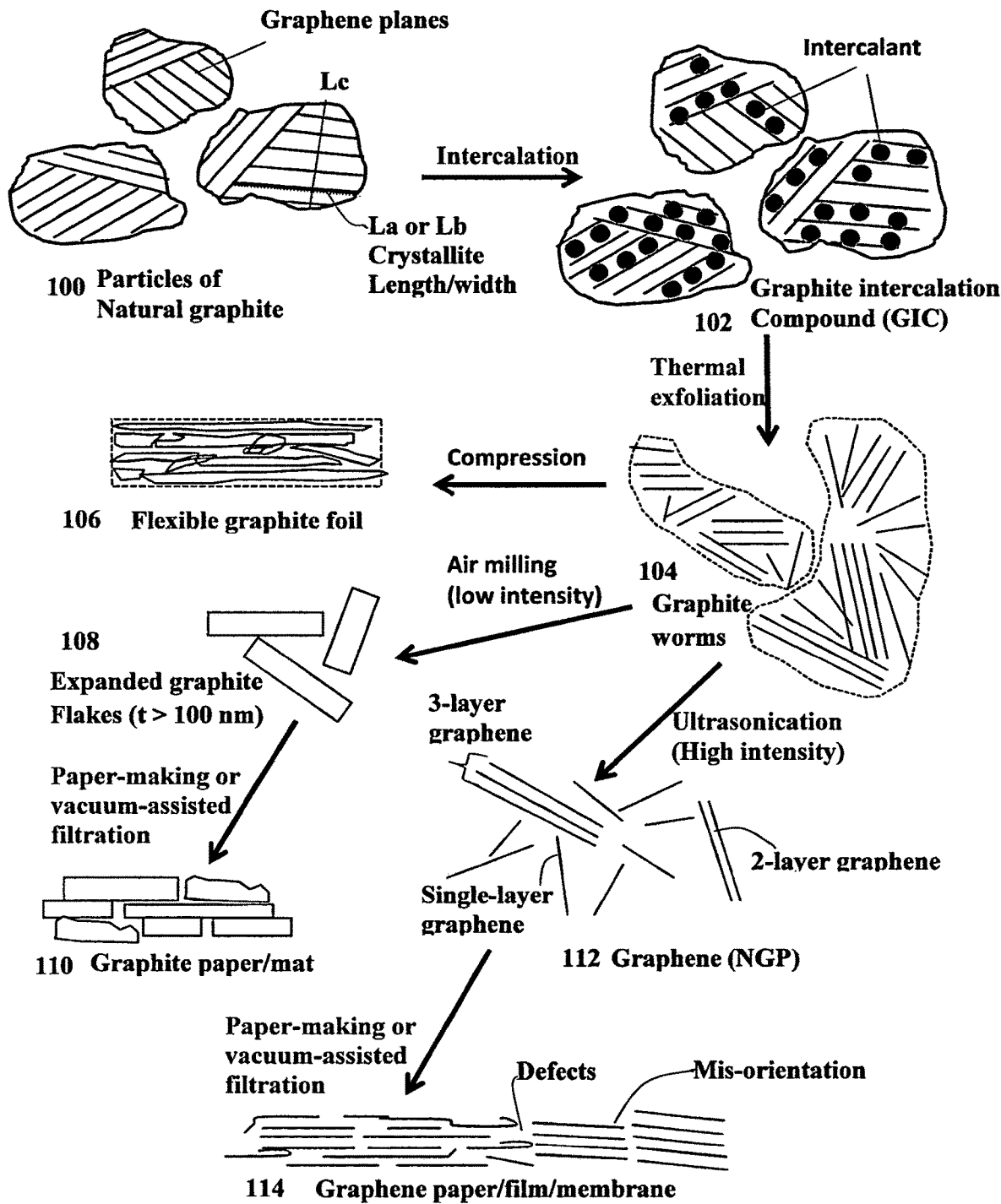

The precursor to the unitary graphene layer is graphene oxide gel 21 (FIG. 1(a)). This GO gel is obtained by immersing a graphitic material 20 in a powder or fibrous form in a strong oxidizing liquid in a reaction vessel to form a suspension or slurry, which initially is optically opaque and dark. This optical opacity reflects the fact that, at the outset of the oxidizing reaction, the discrete graphite flakes and, at a later stage, the discrete graphene oxide flakes scatter and/or absorb visible wavelengths, resulting in an opaque and generally dark fluid mass. If the reaction between graphite powder and the oxidizing agent is allowed to proceed at a sufficiently high reaction temperature for a sufficient length of time, this opaque suspension is transformed into a brown-colored and typically translucent or transparent solution, which is now a homogeneous fluid called "graphene oxide gel" (21 in FIG. 1(a)) that contains no discernible discrete graphite flakes or graphite oxide platelets. If dispensed and deposited under a shear stress field, the GO gel undergoes viscosity reduction and molecular orientation to form "oriented GO" 35, which can be heat-treated to become a unitary graphene material 37.

Again, this graphene oxide gel is typically optically transparent or translucent and visually homogeneous with no discernible discrete flakes/platelets of graphite, graphene, or graphene oxide dispersed therein. In the GO gel, the GO molecules are uniformly dissolved in an acidic liquid medium. In contrast, conventional suspension of discrete graphene sheets, graphene oxide sheets, and expanded graphite flakes in a fluid (e.g. water, organic acid or solvent) look dark, black or heavy brown in color with individual graphene or graphene oxide sheets or expanded graphite flakes discernible or recognizable even with naked eyes or a low-magnification light microscope (100x-1,000x).

The graphene oxide molecules dissolved in the liquid medium of a graphene oxide gel are aromatic chains that have an average number of benzene rings in the chain typically less than 1,000, more typically less than 500, and many less than 100. Most of the molecules have more than 5 or 6 benzene rings (mostly >10 benzene rings) from combined atomic force microscopy, high-resolution TEM, and molecular weight measurements. Based on our elemental analysis, these benzene-ring type of aromatic molecules are heavily oxidized, containing a high concentration of functional groups, such as —COOH and —OH and, therefore, are "soluble" (not just dispersible) in polar solvents, such as water. The estimated molecular weight of these graphene oxide polymers in the gel state is typically between 200 g/mole and 43,000 g/mole, more typically between 400 g/mole and 21,500 g/mole, and most typically between 400 g/mole and 4,000 g/mole.

These soluble molecules behave like polymers and are surprisingly capable of reacting and getting chemically connected with one another (during the subsequent heat treatment or re-graphitization treatment) to form a unitary graphene fiber of good structural integrity and high thermal conductivity. Conventional discrete graphene sheets, graphene oxide sheets, or graphite flakes do not have any self-reacting or cohesive bonding capability.

Again, specifically and most significantly, these graphene oxide molecules present in a GO gel state are capable of chemically bonding, linking, or merging with one another and getting integrated into extremely long and wide graphene planes (e.g. FIG. 3(a)) when the gel is dried and heat-treated at a sufficiently high temperature for a sufficiently long period of time. These graphene planes can run as wide as the filament thickness or diameter and they are parallel to one another. No individual graphene platelets or sheets are discernible; they have been chemically converted to chemically active or living GO molecules that are fully linked and integrated chemically with one another to form a unitary body in the fiber axis direction, and these graphene planes appear to be chemically bonded with one another along the thickness-direction (or Z-direction). X-ray diffraction studies have confirmed that the d-spacing (inter-graphene plane distance) has been recovered back to approximately 0.3354 nm (with 0%-0.001% by weight of oxygen) to 0.40 nm (with approximately 5.0-10% oxygen). There does not appear to be any gap between these graphene planes and, hence, these planes have been essentially merged into one big unitary body, which is like a graphene single crystal. FIG. 3(a) depicts an example of such a huge unitary body. The formation process for such a unitary graphene entity is further illustrated in FIG. 3(c).

The starting graphitic material to be heavily oxidized for the purpose of forming graphene oxide gel may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof. The graphitic material is preferably in a powder or short filament form having a dimension lower than 20 µm, more preferably lower than 10 µm, further preferably smaller than 5 µm, and most preferably smaller than 1 µm.

Using artificial graphite with an average particle size of 9.7 µm as an example, a typical procedure involves dispersing graphite particles in an oxidizer mixture of sulfuric acid, nitric acid, and potassium permanganate (at a weight ratio of 3:1:0.05) at a temperature of typically 0-60° C. for typically at least 3 days, preferably 5 days, and more preferably 7 days or longer. The average molecular weight of the resulting graphene oxide molecules in a gel is approximately 20,000-40,000 g/mole if the treatment time is 3 days, <10,000 g/mole if 5 days, and <4,000 g/mole if longer than 7 days. The required gel formation time is dependent upon the particle size of the original graphitic material, a smaller size requiring a shorter time. It is of fundamental significance to note that if the critical gel formation time is not reached, the suspension of graphite powder and oxidizer (graphite particles dispersed in the oxidizer liquid) appears completely opaque and heterogeneous, meaning that discrete graphite particles or flakes remain suspended (but not dissolved) in the liquid medium. As soon as this critical time is exceeded, the whole suspension becomes optically translucent or transparent (if sufficiently low GO contents), or brown colored, meaning that the heavily oxidized graphite completely loses its original graphite identity and the resulting graphene oxide molecules are completely dissolved in the oxidizer liquid, forming a homogeneous solution (no longer just a suspension or slurry).

It must be further noted that if the suspension or slurry, with a treatment time being shorter than the required gel formation time, is rinsed and dried, we would simply recover a graphite oxide powder or graphite intercalation compound (GIC) powder, which can be exfoliated and separated to produce discrete nano graphene platelets (NGPs). Without an adequate amount of a strong oxidizing agent and an adequate duration of oxidation time, the graphite or graphite oxide particles would not be converted into the GO gel state.

If the graphene oxide gel is obtained from a graphitic material having an original graphite grain size (e.g. an average grain size, $D_g$), the resulting unitary graphene material is a single crystal or a poly-crystal graphene structure having a grain size significantly larger than this original grain size. The unitary graphene material does not have any grain that can be identified to be associated with any particular particle of the starting graphitic material. Original particles have already completely lost their identity when they are converted into graphite oxide molecules that are chemically linked up and merged or integrated into a network of graphene chains essentially infinite in molecular weight.

Further, even if graphene oxide gel is obtained from a graphitic material having multiple graphite crystallites exhibiting no preferred crystalline orientation (e.g. powder of natural graphite) as determined by an X-ray diffraction or electron diffraction method, the resulting unitary graphene material (a single crystal or a poly-crystal graphene structure) typically exhibits a very high degree of preferred crystalline orientation as determined by the same X-ray diffraction or electron diffraction method. This is yet another piece of evidence to indicate that the constituent graphene planes of hexagonal carbon atoms that constitute the particles of the original or starting graphitic material have been chemically modified, converted, re-arranged, re-oriented, linked or cross-linked, merged and integrated, re-graphitized, and even re-crystallized.

Example 1: Preparation of Discrete Nano Graphene Platelets (NGPs)

Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) was subjected to a thermal shock at 1050° C. for 45 seconds in a tube furnace to form exfoliated graphite (or graphite worms).

Five grams of the resulting exfoliated graphite (graphite worms) were mixed with 2,000 ml alcohol solution consisting of alcohol and distilled water with a ratio of 65:35 for 12 hours to obtain a suspension. Then the mixture or suspension was subjected to ultrasonic irradiation with a power of 200 W for various times. After two hours of sonication, EG particles were effectively fragmented into thin NGPs. The suspension was then filtered and dried at 80° C. to remove residue solvents. The as-prepared NGPs have an average thickness of approximately 9.7 nm. NGPs are used here for comparison purposes since these sheets or platelets are not living chains and, under comparable processing conditions, do not lead to graphitic fibers that exhibit the combined conductivity, strength, and modulus characteristics of the presently invented GO gel-derived unitary graphene fibers. These discrete, "dead" graphene sheets cannot get chemically linked with one another and the resulting graphene fibers are found to be relatively brittle.

Example 2: Preparation of Graphene Oxide (GO) Gel

In one example, graphite oxide gel was prepared by oxidation of graphite particles with an oxidizer liquid consisting of sulfuric acid, sodium nitrate, and potassium permanganate at a ratio of 4:1:0.05 at 30° C. When natural graphite (particle sizes of 14 μm) were immersed and dispersed in the oxidizer mixture liquid, the suspension or slurry appeared optically opaque and dark. The suspension remained opaque during the first 52 hours of reaction. However, the suspension gradually turned optically translucent (a little cloudy) when the reaction time exceeds 52 hours, and the color of the suspension changed from black to dark brown. After 96 hours, the suspension suddenly became an optically translucent solution with light brown color. The suspension was a solution, which appeared very uniform in color and transparency, indicating the absence of any dispersed discrete objects. The whole solution behaves like a gel, very similar to a typical polymer gel.

Thin and narrow filaments of this GO gel were dispensed and deposited on a on a plastic sheet surface moving from one roller to another roller. By removing the liquid medium from the cast GO gel filaments we obtained thin graphene oxide filaments. These thin fibers look like, feel like, and behave like a regular polymer fiber. However, upon re-graphitization at a temperature (from 100° C., to 2,800° C.) for typically 1-5 hours, each GO fiber was transformed into a unitary graphene entity comprising large-size graphene domains (e.g. FIG. 3(a)).

Figure 7A:
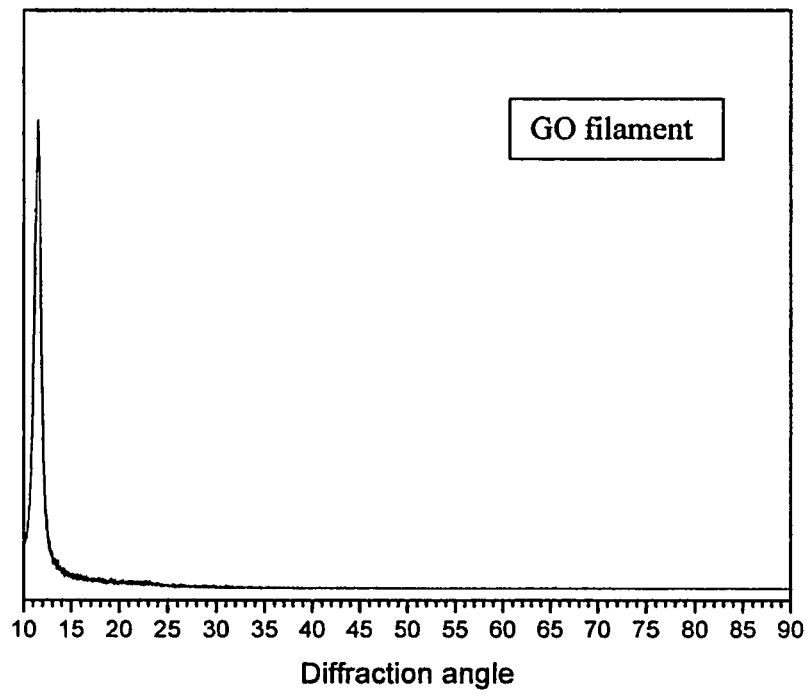
FIG. 7 X-ray diffraction curves of (a) a GO filament (dried GO gel filament), (b) GO filament thermally reduced at 150° C. (partially reduced), (c) highly reduced and re-graphitized unitary graphene filament, and (d) highly re-graphitized and re-crystallized graphitic fiber (a more advanced unitary graphene material) showing a high-intensity (004) peak.
Figure 7B:
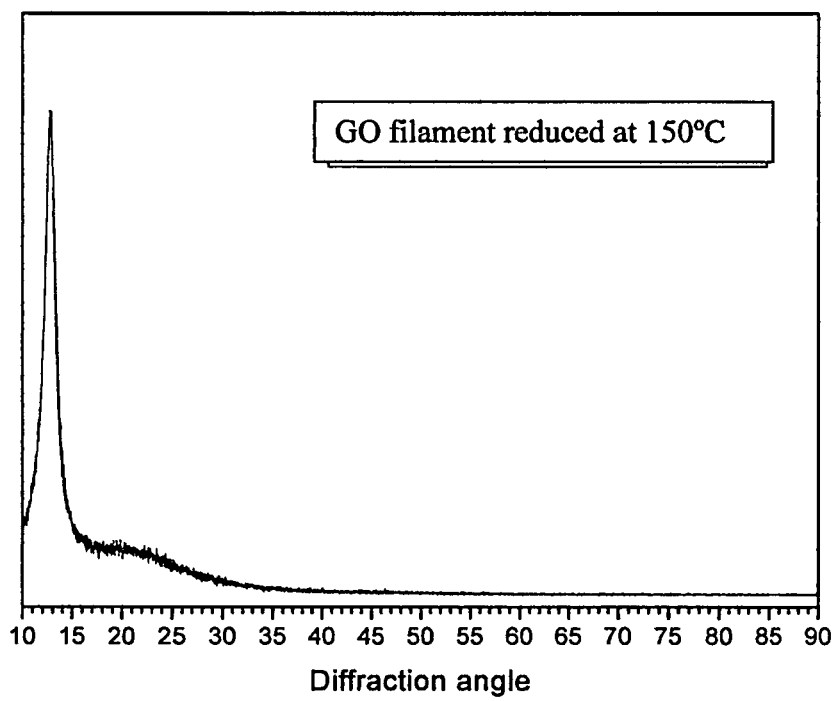
Figure 7C:
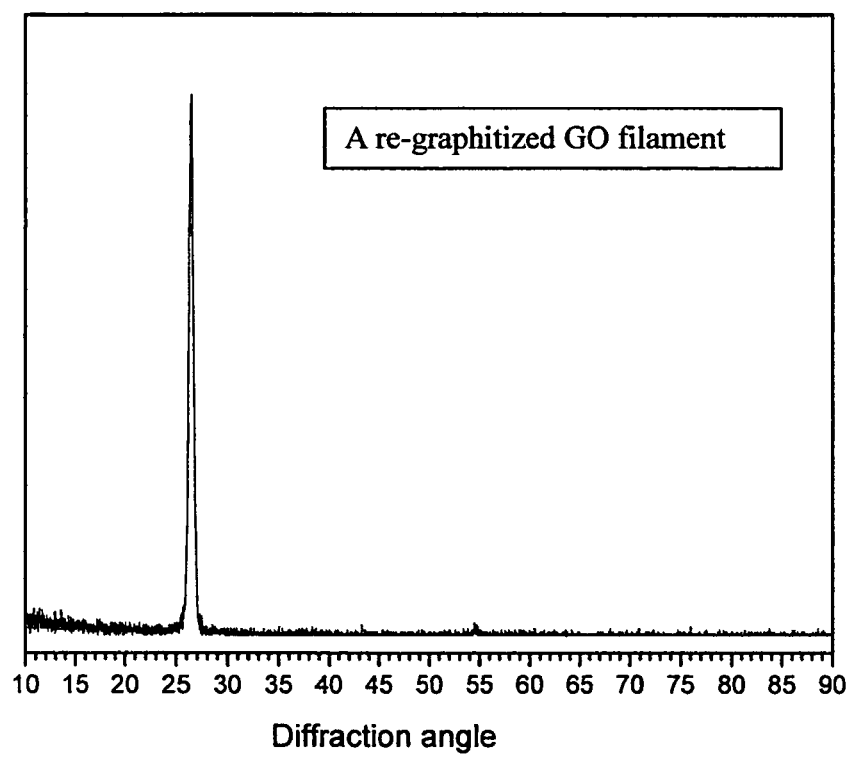

The X-ray diffraction curves of a GO filament (GO gel filament laid on a glass surface with liquid medium removed) prior to a heat treatment, a GO filament thermally reduced at 150° C. for one hour, and a highly reduced and re-graphitized GO filament (a unitary graphene fiber) are shown in FIGS. 7(a), 7(b), and 7(c), respectively. The peak at approximately 2θ=12° of the dried GO filament (FIG. 7(a)) corresponds to an inter-graphene spacing ($d_{002}$) of approximately 0.7 nm. With some heat treatment at 150° C., the GO fiber exhibits the formation of a hump centered at 22° (FIG. 7(b)), indicating that it has begun the process of decreasing the inter-graphene spacing, reflecting the beginning of chemical linking and ordering processes. With a heat treatment temperature of 2,500° C. for one hour, the $d_{002}$ spacing has decreased to approximately 0.336, close to 0.3354 nm of a graphite single crystal.

Figure 7D:
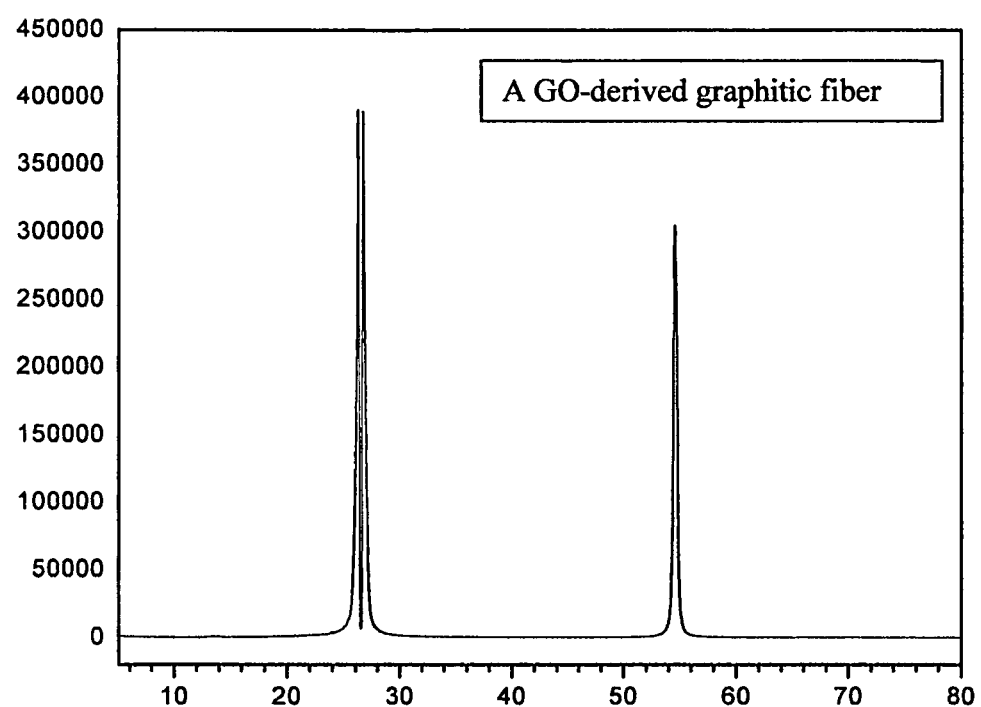

With a heat treatment temperature of 2,750° C. for one hour, the $d_{002}$ spacing is decreased to approximately to 0.3354 nm, identical to that of a graphite single crystal. In addition, a second diffraction peak with a high intensity appears at 2θ=55° corresponding to X-ray diffraction from (004) plane (FIG. 7(d)). The (004) peak intensity relative to the (002) intensity on the same diffraction curve, or the I(004)/I(002) ratio, is a good indication of the degree of crystal perfection and preferred orientation of graphene planes. The (004) peak is either non-existing or relatively weak, with the I(004)/I(002) ratio<0.1, for all graphitic materials heat treated at a temperature lower than 2,800° C. The I(004)/I(002) ratio for the graphitic materials heat treated at 3,000-3,250° C. (e.g., highly oriented pyrolytic graphite, HOPG) is in the range of 0.2-0.5. For instance, a polyimide-derived pyrolytic graphite with a HTT of 3,000° C. for two hours exhibits a I(004)/I(002) ratio of about 0.41. In contrast, a unitary graphene filament prepared with a HTT of 2,750° C. for one hour exhibits a I(004)/I(002) ratio of 0.78 and a Mosaic spread value of 0.21, indicating a practically perfect graphene single crystal with an exceptional degree of preferred orientation.

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our unitary graphene materials have a mosaic spread value in this range of 0.2-0.4 (if obtained with a heat treatment temperature no less than 2,000° C.).

It may be noted that the I(004)/I(002) ratio for all tens of flexible graphite and graphene paper samples investigated are all <<0.05, practically non-existing in most cases. The I(004)/I(002) ratio for all NGP paper/membrane samples and all the graphene fibers prepared through the coagulation route is <0.1 even after a heat treatment at 3,000° C. for 2 hours. These observations have further confirmed or affirmed the already established notion that the presently invented unitary graphene fiber is a new and distinct class of material that is fundamentally different from any pyrolytic graphite (PG), flexible graphite (FG), and paper/film/membrane/fibers of conventional graphene/GO/RGO sheets/platelets (NGPs).

Figure 8A:
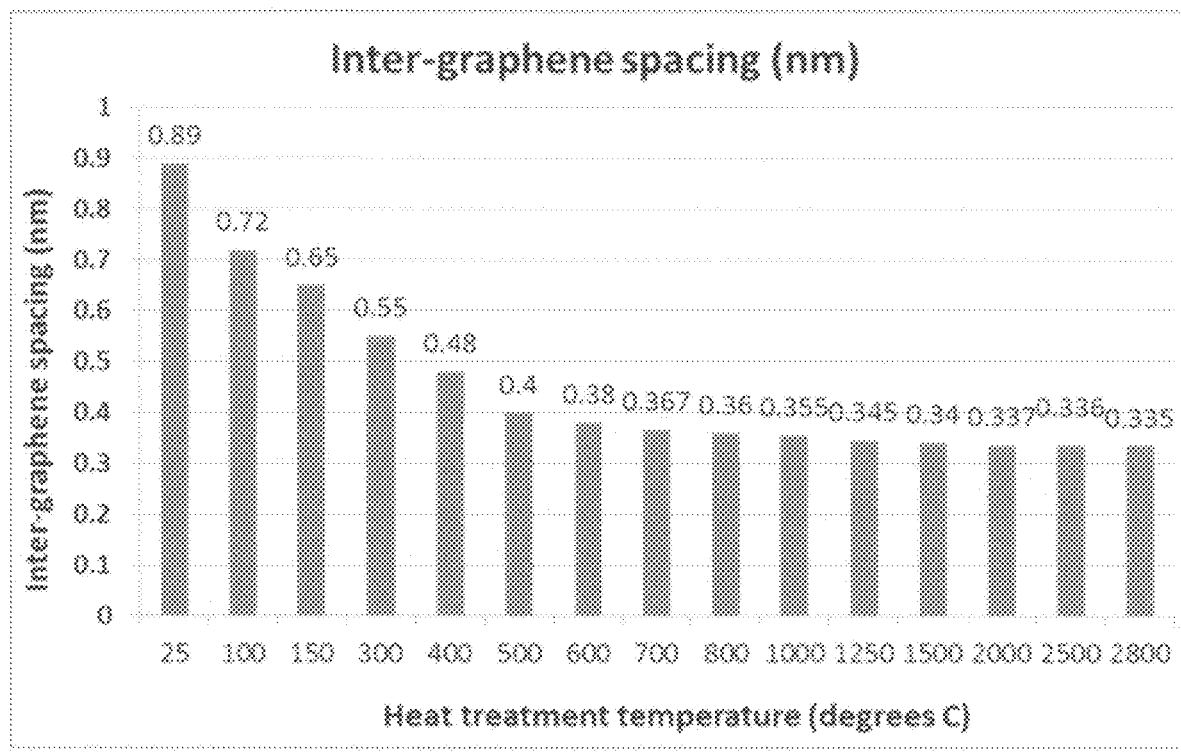
FIG. 8 (a) Inter-graphene plane spacing measured by X-ray diffraction; (b) the oxygen content in the GO gel-derived unitary graphene filaments; and (c) correlation between inter-graphene spacing and the oxygen content.
Figure 8B:
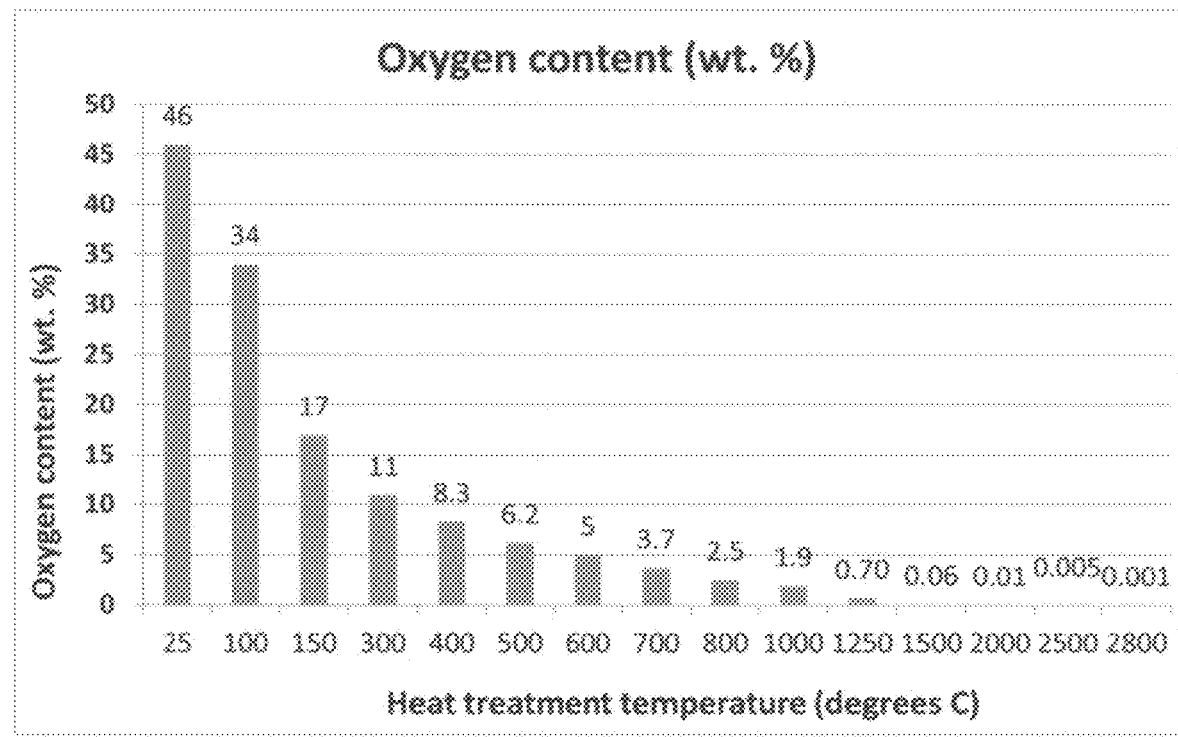
Figure 8C:
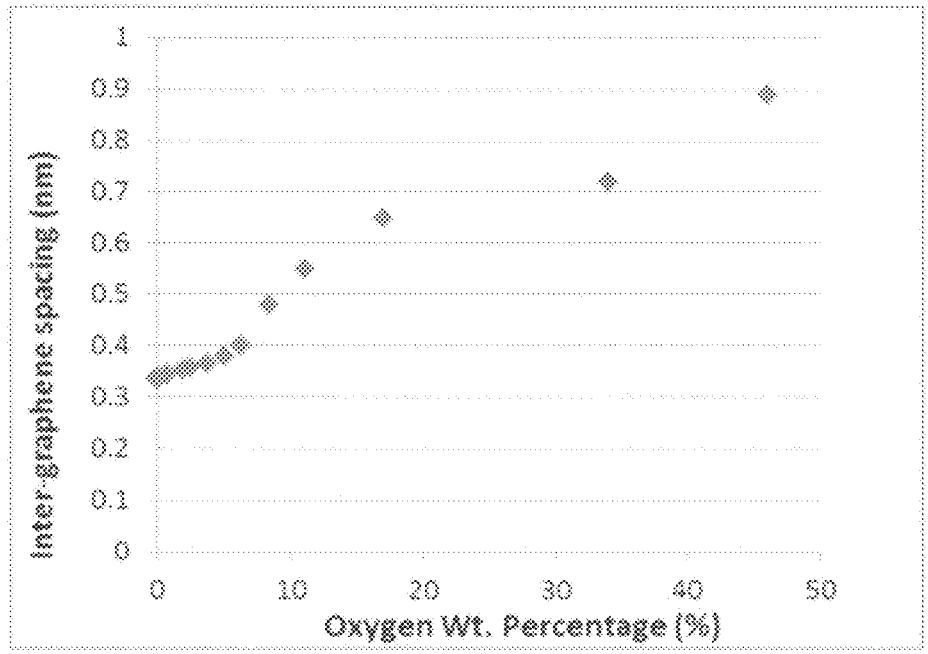

The inter-graphene spacing values of GO gel-derived unitary graphene fibers obtained by heat treating at various temperatures over a wide temperature range are summarized in FIG. 8(a). Corresponding oxygen content values in the GO gel-derived unitary graphene filaments are shown in FIG. 8(b). In order to show the correlation between the inter-graphene spacing and the oxygen content, the data in FIGS. 8(a) and 8(b) are re-plotted in FIG. 8(c). A close scrutiny of FIG. 8(a)-(c) indicate that there are four HTT ranges (100-600° C.; 600-1,250° C.; 1,250-2,000° C., and >2,000° C.) that lead to four respective oxygen content ranges and inter-graphene spacing range.

It is of significance to point out that a heat treatment temperature as low as 600° C. is sufficient to bring the average inter-graphene spacing in GO to below 0.4 nm, getting closer and closer to that of natural graphite or that of a graphite single crystal. The beauty of this approach is the notion that this GO gel strategy has enabled us to re-organize, re-orient, and chemically merge the planar graphene oxide molecules from originally different graphite particles or graphene sheets into a graphene monolith with all the graphene planes now being larger in lateral dimensions (significantly larger than the length and width of original graphene planes) and essentially parallel to one another. This has given rise to a thermal conductivity already >420 W/mK (with a HTT of 500° C.) and >950 W/mk (with a HTT of 700° C.), which is already greater than the value (884 W/mK) of K1100 graphite fibers (Amoco) that are known to have the highest thermal conductivity among all continuous carbon/graphite fibers. The K1100 is obtained from a final HTT of 3,000° C., but we are able to achieve a higher thermal conductivity at such a low re-graphitization temperature. This is astonishing.

These planar GO molecules are derived from the graphene planes that constitute the original structure of starting natural graphite particles (used in the procedure of graphite oxidation to form the GO gel). The original natural graphite particles, when randomly packed into an aggregate or "graphite compact", would have their constituent graphene planes randomly oriented, exhibiting relatively low thermal conductivity and having essentially zero strength (no structural integrity). In contrast, the strength of the unitary graphene layer is typically already in the range of 0.5-8 GPa.

With a HTT as low as 800° C., the resulting unitary graphene filament exhibits a thermal conductivity of 1,148 W/mK, in contrast to the observed 252 W/mK of the graphene fibers via spinning-coagulation with an identical heat treatment temperature. As a matter of fact, no matter how high the HTT is (e.g. even as high as 2,800° C.), coagulation-derived graphene fibers only shows a thermal conductivity lower than 600 W/mK. At a HTT of 2,800° C., the presently invented unitary graphene layer delivers a thermal conductivity of 1,805 W/mK (FIG. 6(a)).

Scanning electron microscopy (SEM), transmission electron microscopy (TEM) pictures of lattice imaging of the graphene filament, as well as selected-area electron diffraction (SAD), bright field (BF), and dark-field (DF) images were also conducted to characterize the structure of unitary graphene fibers.

Figure 2A:
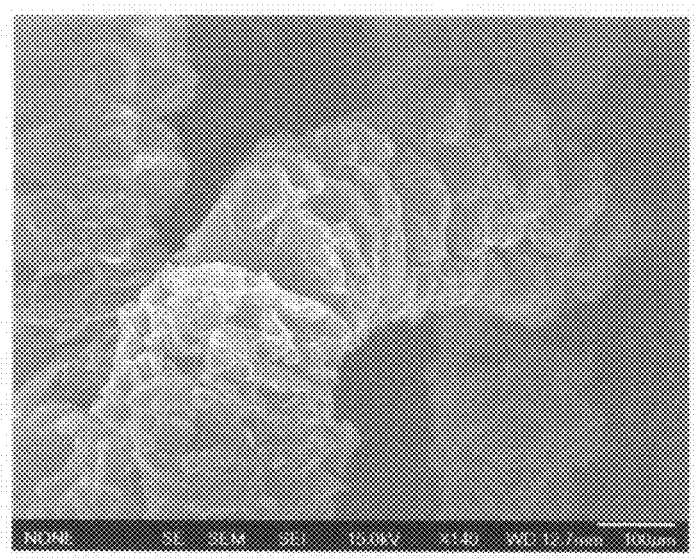
FIG. 2 (a) A SEM image of a graphite worm sample after thermal exfoliation of graphite intercalation compounds (GICs) or graphite oxide powders; (b) An SEM image of a cross-section of a flexible graphite foil, showing many graphite flakes with orientations not parallel to the flexible graphite foil surface and also showing many defects, kinked or folded flakes; (c) and (d) SEM images of an elongated section of prior art graphene fibers produced by solution spinning and liquid coagulation, showing many graphene sheets with orientations not parallel to the fiber axis direction and also showing many defects, pores, kinked or folded graphene sheets.
Figure 2B:
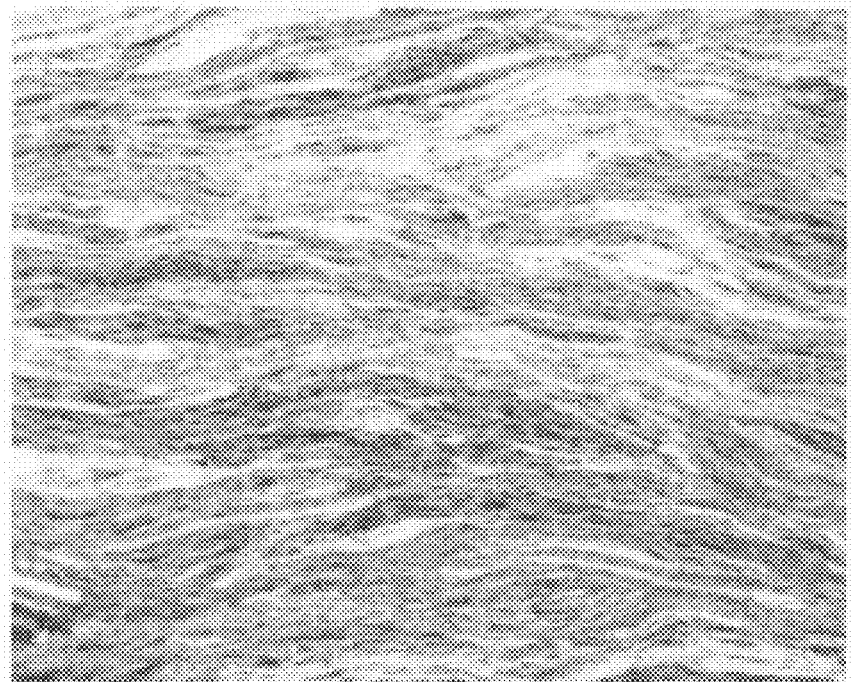
Figure 2C:
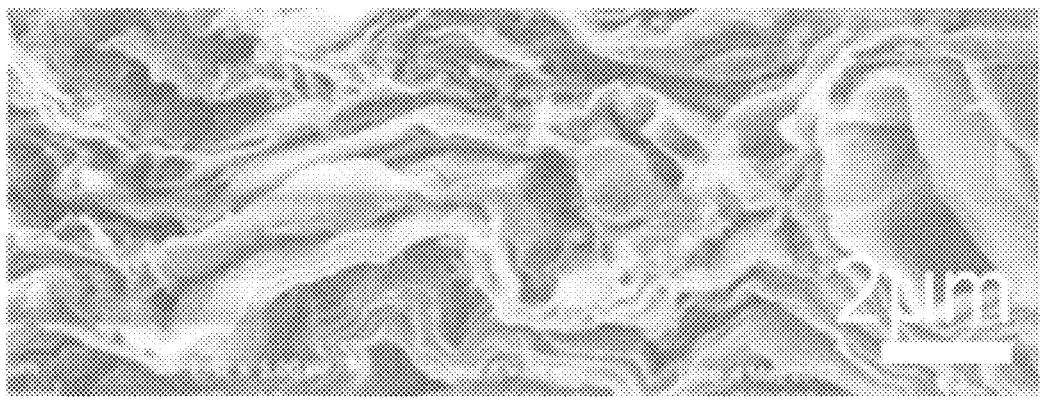
Figure 2D:
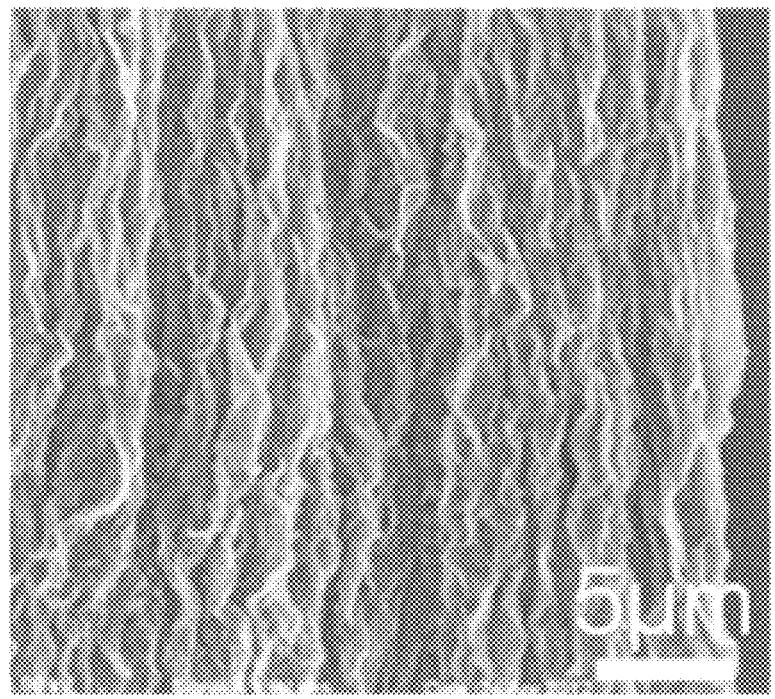

A close scrutiny and comparison of FIGS. 3(a) and 2(c) indicates that the graphene planes in a unitary graphene fiber monolithic are substantially oriented parallel to one another; but this is not the case for coagulation-derived graphene fibers. The inclination angles between two identifiable layers in the unitary graphene entity are mostly less than 5 degrees. In contrast, there are so many folded graphene sheets, kinks, pores, and mis-orientations in coagulation-derived graphene fibers.

Examples 3: Electrical and Thermal Conductivity Measurements of Various Graphene Oxide-Derived Unitary Graphene Fibers Four-point probe tests were conducted on unitary graphene fibers and coagulation-derived graphene fibers. Their in-plane thermal conductivity was measured using a laser flash method (Netzsch Thermal Diffusivity Device).

Figure 5A:
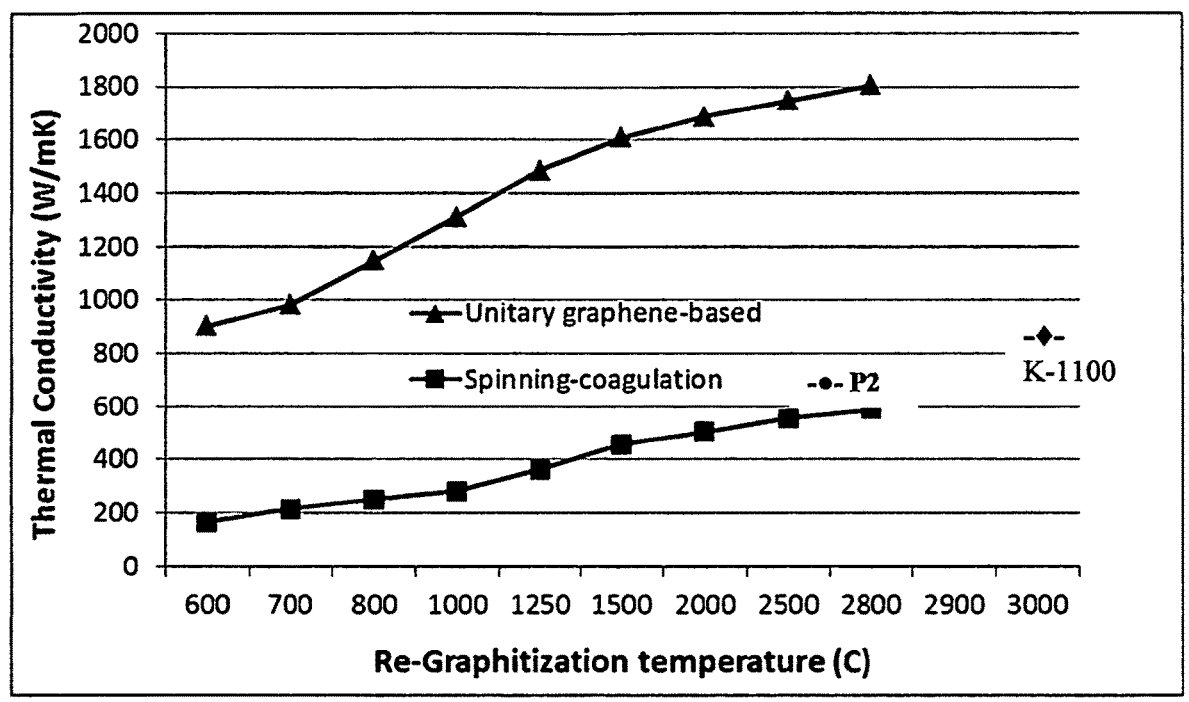
FIG. 5 (a) Thermal conductivity values and (b) electrical conductivity values of the GO gel-derived unitary graphene-based continuous fibers and the fibers produced by spinning of GO suspension into a coagulation bath, both plotted as a function of the final heat treatment temperature. Conductivity values from two high-conductivity graphite fibers (K-1100 and P2 from Amoco) are included for comparison purpose.
Figure 5B:
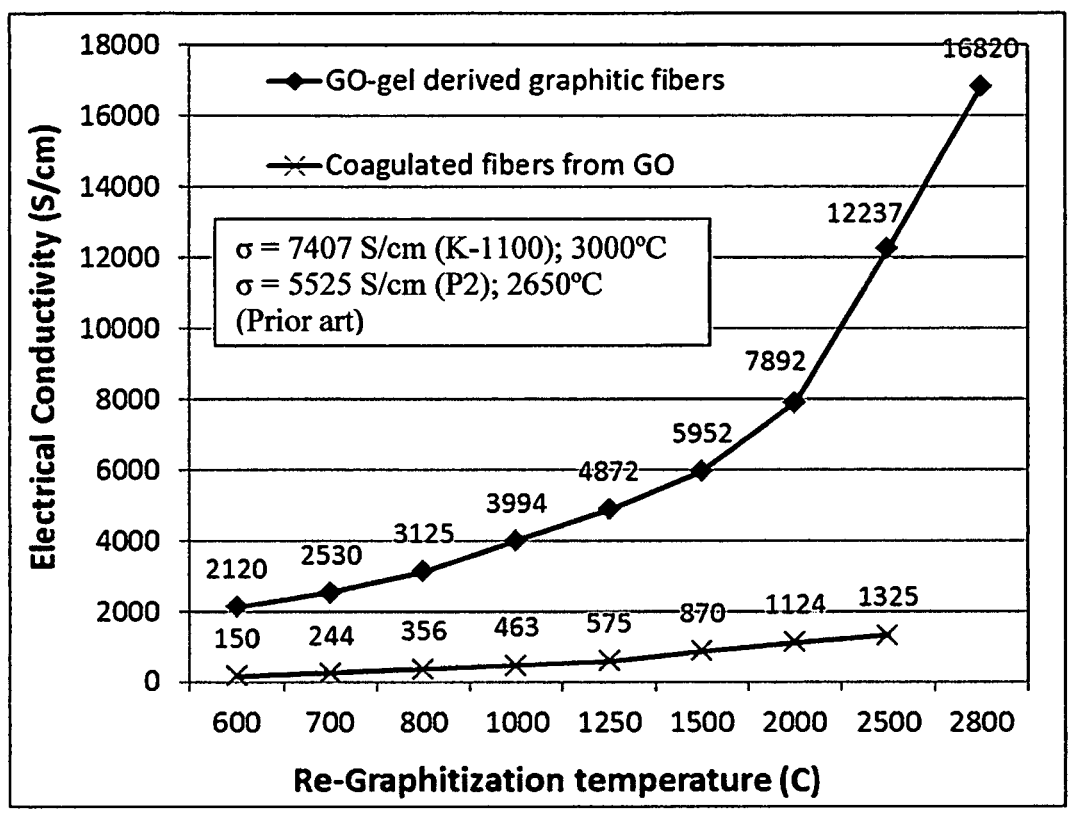

FIG. 5 (a) and FIG. 5(b) show the thermal conductivity and electrical conductivity values, respectively, of the GO gel-derived unitary graphene-based continuous fibers and those of the fibers produced by spinning of GO suspension into a coagulation bath, all plotted as a function of the final heat treatment temperature. These data have clearly demonstrated the superiority of the unitary graphene-based fibers in terms of the achievable thermal conductivity and electrical conductivity at a given heat treatment temperature. All the prior art work on the preparation of continuous graphene fibers results in a simple aggregate or twisted stack of discrete graphene/GO/RGO sheets. These simple aggregates or stacks exhibit many folded graphene sheets, kinks, gaps, and mis-orientations and, hence, are not amenable to re-graphitization of these graphitic sheets or re-crystallization of graphitic domains, resulting in poor thermal conductivity, low electrical conductivity, and weak mechanical strength. As shown in FIG. 5(a), even at a heat treatment temperature as high as 2,800° C., the coagulation-derived graphene fibers exhibit a thermal conductivity less than 600 W/mK, much lower than the >1,800 W/mK of the GO gel-derived unitary graphene entity.

Conductivity values from two high-conductivity graphite fibers (K-1100 and P2 from Amoco) are also included for comparison purposes. K-1100, with a final HTT as high as 3,000° C., exhibits a thermal conductivity (K) of 885 W/mK and electrical conductivity of 7,407 S/cm. P2 fiber, with a final HTT of 2,650° C., exhibits a thermal conductivity (K) of 661 W/mK and electrical conductivity of 5,525 S/cm.

By contrast, the presently invented unitary graphene fibers do not have to go through an ultra-high-temperature graphitization treatment to achieve a high thermal conductivity (e.g. K already=903 W/mK with HTT=600° C. and K=1,487 W/mK with T=1,250° C.). Graphitization of a carbonized fiber (e.g. PAN fiber) requires a temperature typically higher than 2,000° C., most typically higher than 2,500° C. The graphitization temperature is most typically in the range of 2,800-3,200° C. in order for carbonized fibers to achieve a thermal conductivity of 600-885 W/mK. In contrast, the typical heat treatment temperature (re-graphitization treatment) of the presently invented GO-coated laminates is significantly lower than 2,500° C. and more typically lower than 1,500° (can be lower than 600° C.). Graphitization of pitch-based carbon fibers at 2,650° C. gives rise to an electrical conductivity of 5,525 S/cm (P2 fiber). However, our GO-derived unitary graphene fibers achieve 5,952 S/cm at a HTT of 1,500° C. Additionally, K-1100, with a final HTT as high as 3,000° C., exhibits an electrical conductivity of 7,407 S/cm. In contrast, we achieve 16,820 S/cm at 2,800° C. with our graphitic fibers. For continuous fibers, a thermal conductivity of 1,805 W/mK and electrical conductivity of 16,820 are unprecedented. After 60 years of worldwide intensive research, the best carbon/graphite fibers do not even come close to these performance values.

The continuous unitary graphene fibers, the prior art carbon/graphite fibers, and prior art graphene fibers are three fundamentally different and patently distinct classes of materials in terms of chemical composition, morphology, structure, process of production, and various properties.

Figure 6A:
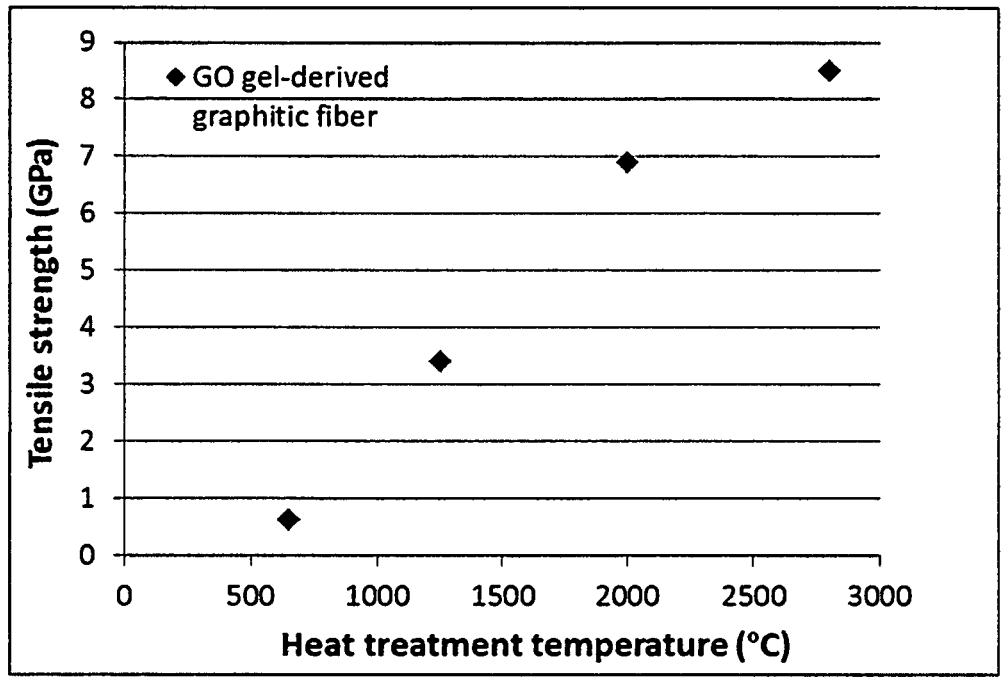
FIG. 6 (a) Tensile strength and (b) Young's modulus of the GO gel-derived unitary graphene-based continuous fibers plotted as a function of the final heat treatment temperature; (c) Tensile strength is plotted as a function of the Young's modulus of the same fibers.
Figure 6B:
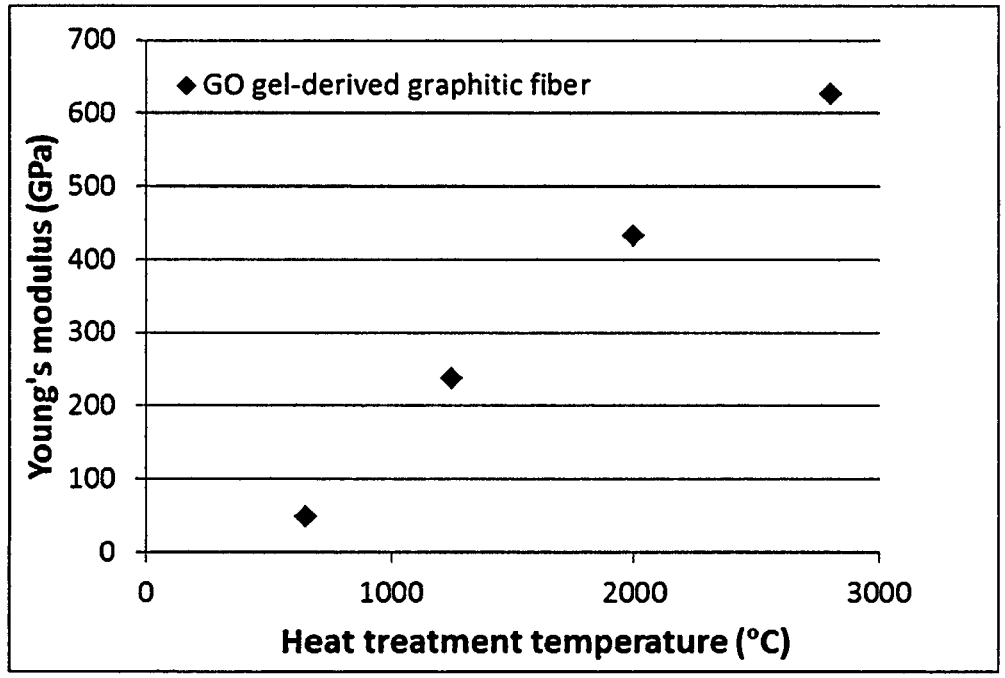
Figure 6C:
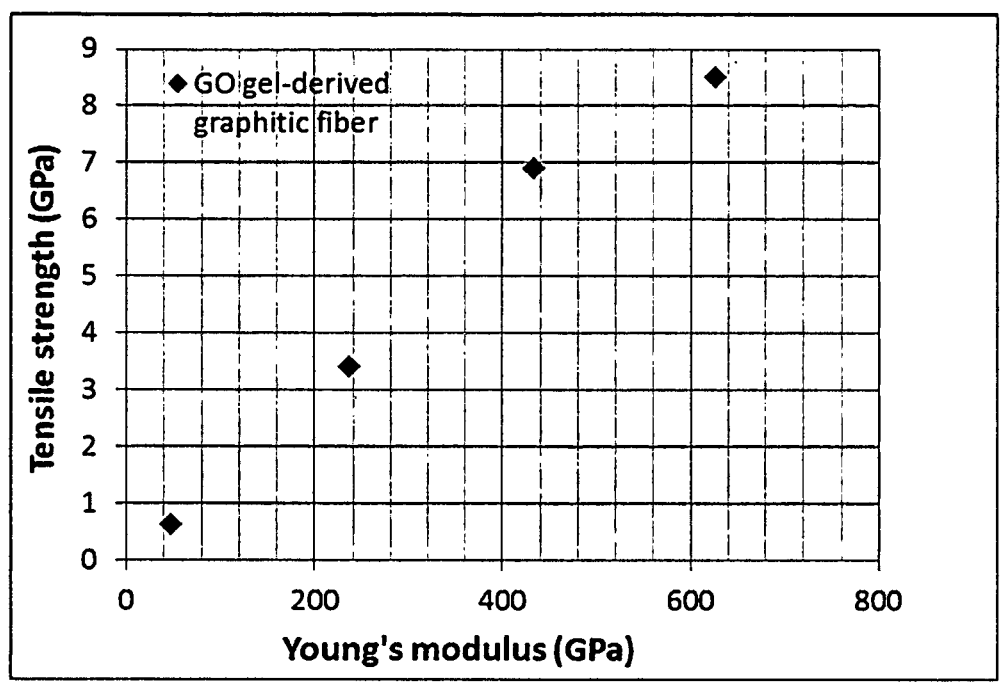

Examples 4: Tensile Strength of Various Graphene Oxide-Derived Unitary Graphene-Based Fibers A series of GO gel-derived unitary graphene fibers were prepared. A universal testing machine was used to determine the tensile strength and Young's modulus of these materials. FIG. 6(a) and FIG. 6(b) summarize the tensile strength and Young's modulus of the GO gel-derived unitary graphene-based continuous fibers plotted as a function of the final heat treatment temperature. In FIG. 6 (c), tensile strength values are plotted as a function of the Young's modulus of the same fibers.

These data have demonstrated that, the tensile strength and Young's modulus of the GO-derived unitary graphene fibers have exceeded the highest strength and highest modulus ever achieved by any continuous carbon or graphite fiber. It may be noted that the carbon/graphite fibers exhibiting the highest tensile strength are derived from PAN-based polymer fibers, but the carbon/graphite fibers exhibiting the highest tensile Young's modulus are derived from petroleum pitch. In other words, highest tensile strength and highest Young's modulus could not be achieved with the same type of carbon/graphite fibers. This is in contrast to the presently invented graphitic fiber, which achieves both the highest tensile strength and the highest Young' modulus with the same fiber. The GO-derived unitary graphene fibers are a class of material by itself.

We claim:

1. A unitary graphene-based continuous graphitic fiber having an inter-planar spacing $d_{002}$ from 0.3354 nm to 0.4 nm as determined by X-ray diffraction and an oxygen content of 0.001 to 5% by weight, wherein said graphene planes are parallel to one another and parallel to a fiber axis direction and said graphitic fiber contains no core-shell structure and no helically arranged graphene domains, wherein said unitary graphitic fiber is a single crystal or a poly-crystal graphene structure that has a thickness greater than 100 nm, a physical density no less than 1.7 g/cm$^3$, an electrical conductivity from 3,000 S/cm to 20,000 S/cm and a thermal conductivity from 600 W/mK to 1,805 W/mK, and said unitary graphene material has a preferred crystalline orientation, wherein said graphene planes are closely packed and parallel to one another.

2. The continuous graphitic fiber of claim 1, wherein said inter-plane spacing $d_{002}$ is from 0.3354 nm to 0.36 nm and the oxygen content is from 0.01 to 2% by weight.

3. The continuous graphitic fiber of claim 1, having a cross-section that is circular, elliptical, rectangular, flat-shaped, or hollow.

4. The continuous graphitic fiber of claim 1, having a diameter or thickness from 10 μm to 100 μm.

5. The continuous graphitic fiber of claim 1, having a diameter or thickness less than 10 μm.

6. The continuous graphitic fiber of claim 1, having a diameter or thickness less than 1 μm.

7. The continuous graphitic fiber of claim 1, having a diameter or thickness less than 100 nm.

8. The continuous graphitic fiber of claim 1, having an oxygen content from 0.001 to 1% by weight, an inter-graphene spacing less than 0.345 nm, a thermal conductivity from 1,000 W/mK to 1,700 W/mK and/or an electrical conductivity from 2,000 S/cm to 12,000 S/cm.

9. The continuous graphitic fiber of claim 1, having an oxygen content from 0.001% to 0.01%, an inter-graphene spacing less than 0.337 nm, a thermal conductivity from 1,000 W/mK to 1,700 W/mK, and/or an electrical conductivity from 4,500 S/cm to 12,000 S/cm.

10. The continuous graphitic fiber of claim 1, having an oxygen content no greater than 0.001%, an inter-graphene spacing less than 0.336 nm, a mosaic spread value no greater than 0.7, a thermal conductivity from 1,000 W/mK to 1,805 W/mK, and/or an electrical conductivity from 7,000 S/cm to 12,000 S/cm.

11. The continuous graphitic fiber of claim 1, having an inter-graphene spacing less than 0.336 nm, a mosaic spread value no greater than 0.4, a thermal conductivity from 1,700 W/mK to 1,805 W/mK, and/or an electrical conductivity greater than 12,000 S/cm.

12. The continuous graphitic fiber of claim 1, wherein the continuous graphitic fiber exhibits an inter-graphene spacing less than 0.337 nm and a mosaic spread value less than 1.0.

13. The continuous graphitic fiber of claim 1, wherein the continuous graphitic fiber exhibits a degree of graphitization no less than 40% and/or a mosaic spread value less than 0.7.

14. The continuous graphitic fiber of claim 1, wherein the continuous graphitic fiber exhibits a degree of graphitization no less than 80% and/or a mosaic spread value no greater than 0.4.

15. The continuous graphitic fiber of claim 1, wherein said continuous graphitic fiber contains chemically bonded graphene molecules or chemically merged graphene planes that are parallel to one another.

16. The continuous graphitic fiber of claim 1, wherein said continuous graphitic fiber contains a first graphene domain containing bonded graphene planes parallel to one another and having a first crystallographic c-axis, and a second graphene domain containing bonded graphene planes parallel to one another and having a second crystallographic c-axis wherein the first crystallographic c-axis and the second crystallographic c-axis are inclined with respect to each other at an angle less than 10 degrees.

17. The continuous graphitic fiber of claim 1, wherein said continuous graphitic fiber contains no complete grain boundary therein, is a graphite single crystal, or a poly-crystal graphite structure with graphene molecules being oriented along a fiber axis direction.

18. The continuous graphitic fiber of claim 1, wherein said continuous graphitic fiber is a poly-crystal graphitic structure having a grain size from 1 μm to 10 μm.

19. The continuous graphitic fiber of claim 1, wherein said continuous graphitic fiber is a poly-crystal graphitic structure having a grain size from 10 µm to 100 µm.

20. The continuous graphitic fiber of claim 1, wherein said continuous graphitic fiber is a poly-crystal graphitic structure having a grain size larger than 100 µm.

21. The continuous graphitic fiber of claim 1, wherein said continuous graphitic fiber contains a combination of $sp^2$ and $sp^3$ electronic configurations.

22. The continuous graphitic fiber of claim 1, wherein said continuous graphitic fiber has a physical density greater than 1.7 g/cm$^3$, a Young's modulus greater than 60 GPa, and/or a tensile strength greater than 1.2 GPa.

23. The continuous graphitic fiber of claim 1, wherein said continuous graphitic fiber has an electrical conductivity greater than 5,000 S/cm, a thermal conductivity from 1,000 W/mK to 1,805 W/mK, a physical density greater than 1.8 g/cm$^3$, a Young's modulus greater than 200 GPa, and/or a tensile strength greater than 3.2 GPa.

24. The continuous graphitic fiber of claim 1, wherein said continuous graphitic fiber has an electrical conductivity greater than 15,000 S/cm, a thermal conductivity from 1,500 W/mK to 1,805 W/mK, a physical density greater than 1.9 g/cm$^3$, a Young's modulus greater than 300 GPa, and/or a tensile strength greater than 5.0 GPa.

25. The continuous graphitic fiber of claim 1, wherein said continuous graphitic fiber has an electrical conductivity greater than 18,000 S/cm, a thermal conductivity from 1,700 W/mK to 1,805 W/mK, a physical density greater than 1.9 g/cm$^3$, a Young's modulus greater than 600 GPa, and/or a tensile strength measured greater than 8.0 GPa.

26. A fiber yarn or bundle comprising at least a continuous graphitic fiber of claim 1.

27. A fiber yarn or bundle comprising multiple continuous graphitic fibers of claim 1.

* * * * *